US012462964B2

(12) United States Patent
Matsuura

(10) Patent No.: US 12,462,964 B2
(45) Date of Patent: Nov. 4, 2025

(54) COIL COMPONENT, CIRCUIT BOARD, ELECTRONIC DEVICE, AND METHOD OF MANUFACTURING COIL COMPONENT

(71) Applicant: TAIYO YUDEN CO., LTD., Tokyo (JP)

(72) Inventor: Hitoshi Matsuura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 948 days.

(21) Appl. No.: 17/591,332

(22) Filed: Feb. 2, 2022

(65) Prior Publication Data

US 2022/0277884 A1 Sep. 1, 2022

(30) Foreign Application Priority Data

Feb. 26, 2021 (JP) ................................ 2021-030452

(51) Int. Cl.
*H01F 27/28* (2006.01)
*H01F 1/147* (2006.01)
(Continued)

(52) U.S. Cl.
CPC ....... *H01F 27/255* (2013.01); *H01F 1/14766* (2013.01); *H01F 27/2823* (2013.01); *H01F 41/0246* (2013.01); *H01F 41/04* (2013.01)

(58) Field of Classification Search
CPC ............... H01F 27/255; H01F 1/14766; H01F 27/2823; H01F 41/0246; H01F 41/04;
(Continued)

(56) References Cited

U.S. PATENT DOCUMENTS

2014/0002221 A1* 1/2014 Shin ........................ H01F 17/04 336/83
2015/0155084 A1* 6/2015 Kim .................... H01F 17/0013 336/200

(Continued)

FOREIGN PATENT DOCUMENTS

JP 63-271905 A 11/1988

OTHER PUBLICATIONS

Notice of Reasons for Refusal dated Oct. 1, 2024, issued in corresponding Japanese Patent Application No. 2021-030452 with English translation (9 pgs.).

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

A coil component according to one aspect of the present invention includes: a coil conductor extending around a coil axis; and a magnetic base body intersecting the coil axis. The magnetic base body includes first metal magnetic particles, second metal magnetic particles, and magnetic gap portions, each of the first metal magnetic particles having a first elastic limit and a first relative permeability, each of the second metal magnetic particles having a second elastic limit smaller than the first elastic limit and a second relative permeability lower than the first relative permeability, each of the magnetic gap portions covering a surface of associated one of the first metal magnetic particles and configured such that a first thickness of the magnetic gap portion in a first direction along the coil axis is larger than a second thickness of the magnetic gap portion in a second direction perpendicular to the first direction.

13 Claims, 11 Drawing Sheets

(51) Int. Cl.
*H01F 27/255* (2006.01)
*H01F 41/02* (2006.01)
*H01F 41/04* (2006.01)

(58) Field of Classification Search
CPC ......... H01F 27/2804; H01F 2027/2809; H01F 1/26; H01F 1/33; H01F 41/046; H01F 5/00; H01F 1/06
USPC ........................ 336/221, 83, 192, 198.2, 232
See application file for complete search history.

(56) References Cited

U.S. PATENT DOCUMENTS

2016/0314889 A1* 10/2016 Ryu .................... H01F 41/0246
2017/0117082 A1* 4/2017 Jeong .................... H01F 27/255
2018/0061550 A1* 3/2018 Lee ..................... H01F 17/0013
2019/0051445 A1* 2/2019 Wada ........................ H01F 1/34
2019/0392978 A1* 12/2019 Matsuura ................ H01F 17/04

* cited by examiner

Before Pressurizing

COIL COMPONENT, CIRCUIT BOARD, ELECTRONIC DEVICE, AND METHOD OF MANUFACTURING COIL COMPONENT

CROSS-REFERENCE TO RELATED APPLICATIONS

This application is based on and claims the benefit of priority from Japanese Patent Application Serial No. 2021-030452 (filed on Feb. 26, 2021), the contents of which are hereby incorporated by reference in their entirety.

TECHNICAL FIELD

The present disclosure relates to a coil component, a circuit board, an electronic device, and a method of manufacturing the coil component.

BACKGROUND

Some coil components have been known to include a magnetic base body containing a plurality of types of metal magnetic particles. For example, Japanese Patent Application Publication No. Sho 63-271905 ("the '905 Publication") discloses that a magnetic base body having a high magnetic permeability and excellent DC superposition characteristics can be prepared by pressure-forming on mixture particles in which metal magnetic particles formed of a hard Fe—Si—Al-based alloy are mixed with a pure iron powder softer than the Fe—Si—Al-based alloy.

In preparing a magnetic base body of a coil component by pressure-forming, high molding pressures are conventionally used to increase the filling density of the metal magnetic particles and achieve a high magnetic permeability. For example, the '905 Publication discloses use of a molding pressure of 20 ton/cm$^2$. Such high molding pressures cause plastic deformation of the metal magnetic particles and, in the pressure-formed magnetic base body, adjacent metal magnetic particles are tightly adhered to one another. In such a coil component, the magnetic flux generated when an electric current is applied preferably passes through high permeability particles formed of a magnetic material having a high relative permeability. Therefore, as the direct current running through the coil conductor increases, magnetic saturation occurs sequentially from a magnetic path with a higher proportion of the high permeability particles among a plurality of magnetic paths within the magnetic base body through which the magnetic flux passes.

Thus, in a conventional magnetic base body containing metal magnetic particles formed of two or more types of magnetic materials having different relative permeabilities, there are paths in which magnetic saturation is likely to occur and paths in which magnetic saturation is less likely to occur. Therefore, as the direct current running through the coil conductor increases, magnetic saturations occur sequentially from the magnetic path where magnetic saturation is more likely to occur to the magnetic path where it is less likely to occur among the plurality of magnetic paths. Consequently, the inductance of the coil component gradually decreases. Therefore, in a magnetic base body containing metal magnetic particles formed of two or more types of magnetic materials with different relative permeabilities and formed with a high molding pressure, it is difficult to achieve high DC superposition characteristics.

On the other hand, with a low molding pressure, the filling factor of the metal magnetic particles in the magnetic base body is low, and thus it is difficult to achieve a high inductance.

SUMMARY

One object of the present disclosure is to overcome or reduce at least a part of the above drawback. One of more specific objects of the present disclosure is to improve the DC superposition characteristics of the coil component having a magnetic base body containing metal magnetic particles formed of two or more types of magnetic materials with different relative permeabilities.

Another of more specific objects of the present disclosure is to achieve both a high permeability and high DC superposition characteristics in the coil component having a magnetic base body containing metal magnetic particles formed of two or more types of magnetic materials with different relative permeabilities.

Other objects of the invention disclosed herein will be apparent with reference to the entire description in this specification. The invention disclosed herein may overcome any other drawbacks grasped from the following description, instead of or in addition to the above drawback.

A coil component according to one aspect of the present invention comprises: a coil conductor extending around a coil axis; and a magnetic base body disposed to intersect the coil axis. The magnetic base body includes first metal magnetic particles, second metal magnetic particles, and magnetic gap portions, each of the first metal magnetic particles having a first elastic limit and a first relative permeability, each of the second metal magnetic particles having a second elastic limit smaller than the first elastic limit and a second relative permeability lower than the first relative permeability, each of the magnetic gap portions covering a surface of associated one of the first metal magnetic particles and configured such that a first thickness of the magnetic gap portion in a first direction along the coil axis is larger than a second thickness of the magnetic gap portion in a second direction perpendicular to the first direction.

In one aspect of the present invention, each of the magnetic gap portions includes a first magnetic gap component formed of at least one of a gap or a resin and covering one end of the associated one of the first metal magnetic particles in the first direction.

In one aspect of the present invention, when observed in a sectional surface of the magnetic base body cut along a plane extending through the coil axis, the first magnetic gap component extends in a circumferential direction of the associated one of the first metal magnetic particles for a length of 1/16 or larger and less than ½ of a circumference of the associated one of the first metal magnetic particles.

In one aspect of the present invention, each of the magnetic gap portions includes a second magnetic gap component containing an oxide of an element contained in the associated one of the first metal magnetic particles.

In one aspect of the present invention, a thickness of the second magnetic gap component in the first direction is larger than a thickness of the second magnetic gap component in the second direction.

In one aspect of the present invention, when observed in a sectional surface of the magnetic base body cut along a plane extending through the coil axis, a dimension of each of the magnetic gap portions in the first direction is from 0.5% to 4.0%, both inclusive, of a dimension of the associated one of the first metal magnetic particles in the first direction.

In one aspect of the present invention, both the first metal magnetic particles and the second metal magnetic particles are formed of an Fe—Si-based alloy, and a proportion of Si in the first metal magnetic particles is larger than that in the second metal magnetic particles.

In one aspect of the present invention, a proportion of Fe in the first metal magnetic particles is smaller than that in the second metal magnetic particles.

In the magnetic base body in one aspect of the present invention, a volume proportion of a volume of the first metal magnetic particles to a total volume of the first metal magnetic particles and the second metal magnetic particles is 10 to 65 vol %.

In one aspect of the present invention, the magnetic base body is molded by pressurizing an element body in the first direction, the element body containing the first metal magnetic particles and the second metal magnetic particles.

In one aspect of the present invention, each of the magnetic gap portions includes another first magnetic gap component formed of at least one of a gap or a resin and covering the other end of the associated one of the first metal magnetic particles in the first direction.

A circuit board according to one aspect of the present invention includes any one of the above coil components.

An electronic device according to one aspect of the present invention includes the above circuit board.

One aspect of the present invention relates to a method of manufacturing a coil component. A manufacturing method according to one aspect of the present invention comprises: forming a molded body by filling a magnetic material into a cavity of a mold and pressuring the magnetic material, the cavity of the mold containing a coil conductor placed therein, the coil conductor extending around a coil axis, the magnetic material containing first metal magnetic particles having a first relative permeability and second metal magnetic particles having a second relative permeability lower than the first relative permeability, the magnetic material being pressurized in a direction along the coil axis with a molding pressure smaller than an elastic limit of the first metal magnetic particles and larger than an elastic limit of the second metal magnetic particles; and forming a magnetic base body by unloading the molding pressure and then heat-treating the molded body.

A manufacturing method according to one aspect of the present invention comprises: forming a plurality of magnetic sheets from a mixed magnetic material including first metal magnetic particles having a first relative permeability and second metal magnetic particles having a second relative permeability lower than the first relative permeability; forming a conductive pattern on a surface of each of the plurality of magnetic sheets; forming a laminated body by stacking in a lamination direction the plurality of magnetic sheets each having the conductive pattern formed thereon; forming a molded body by pressurizing the laminated body in the lamination direction with a pressure smaller than an elastic limit of the first metal magnetic particles and larger than an elastic limit of the second metal magnetic particles; and forming a magnetic base body by unloading the molding pressure and then heat-treating the molded body.

A manufacturing method according to one aspect of the present invention comprises: forming a molded body by applying a molding pressure to a mixed magnetic material in one axial direction, the mixed magnetic material containing first metal magnetic particles having a first relative permeability and second metal magnetic particles having a second relative permeability lower than the first relative permeability, the molding pressure being smaller than an elastic limit of the first metal magnetic particles and larger than an elastic limit of the second metal magnetic particles; forming a magnetic base body by heat-treating the molded body; and providing a coil conductor on the magnetic base body so as to extend around the one axial direction.

Advantageous Effects

According to at least one embodiment of the present invention, it is possible to improve the DC superposition characteristics of the coil component having a magnetic base body containing metal magnetic particles formed of two or more types of magnetic materials with different relative permeabilities.

DESCRIPTION OF EXAMPLE EMBODIMENTS

Various embodiments of the present invention will be hereinafter described with reference to the accompanying drawings. Elements common to a plurality of drawings are denoted by the same reference signs throughout the plurality of drawings. For convenience of explanation, the drawings are not necessarily drawn to scale. The following embodiments of the present invention do not limit the scope of the claims. The elements described in the following embodiments are not necessarily essential to solve the problem to be solved by the invention.

Figure 1:
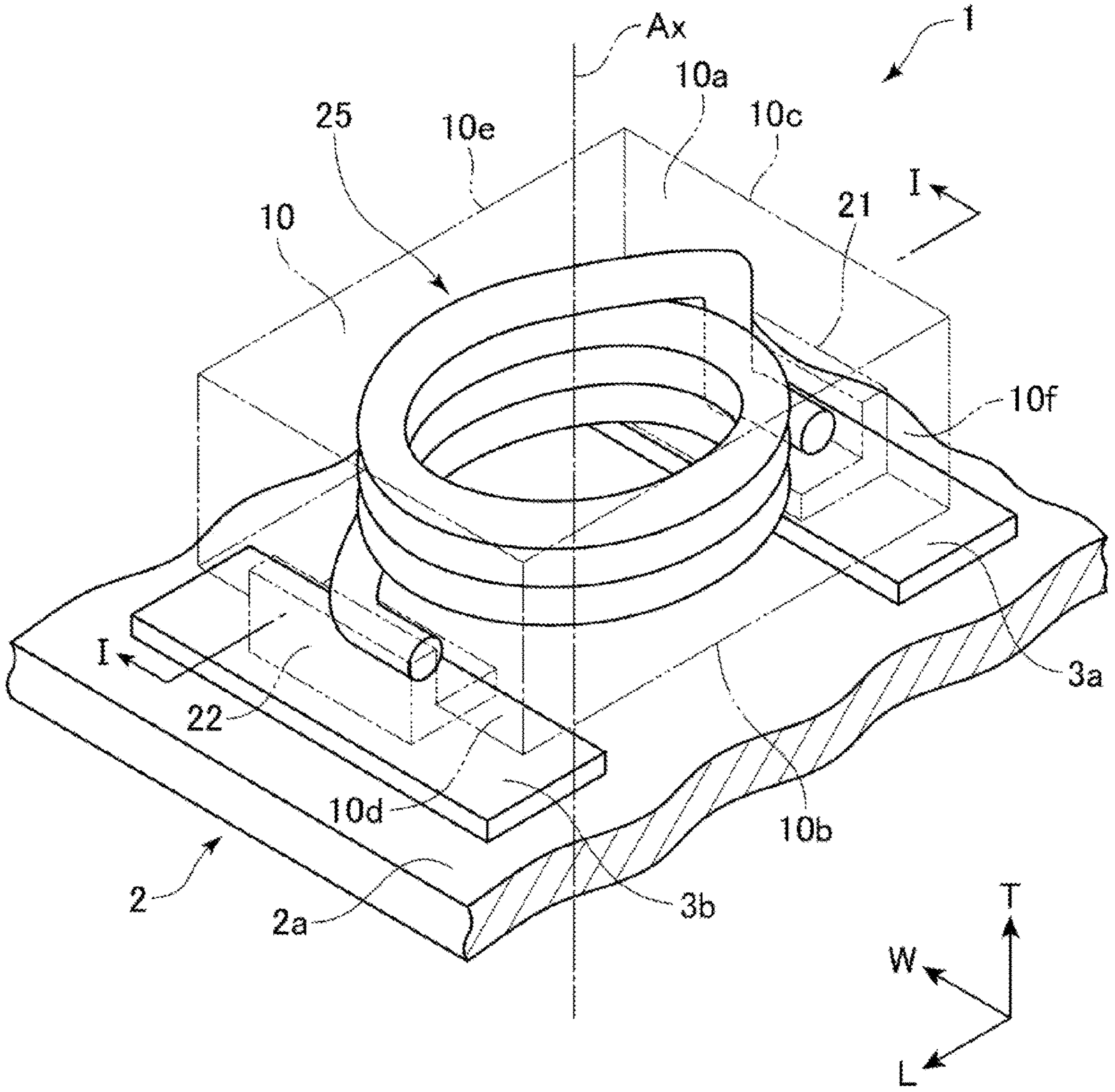
FIG. 1 is a perspective view schematically showing a coil component according to one embodiment of the invention.
Figure 2:
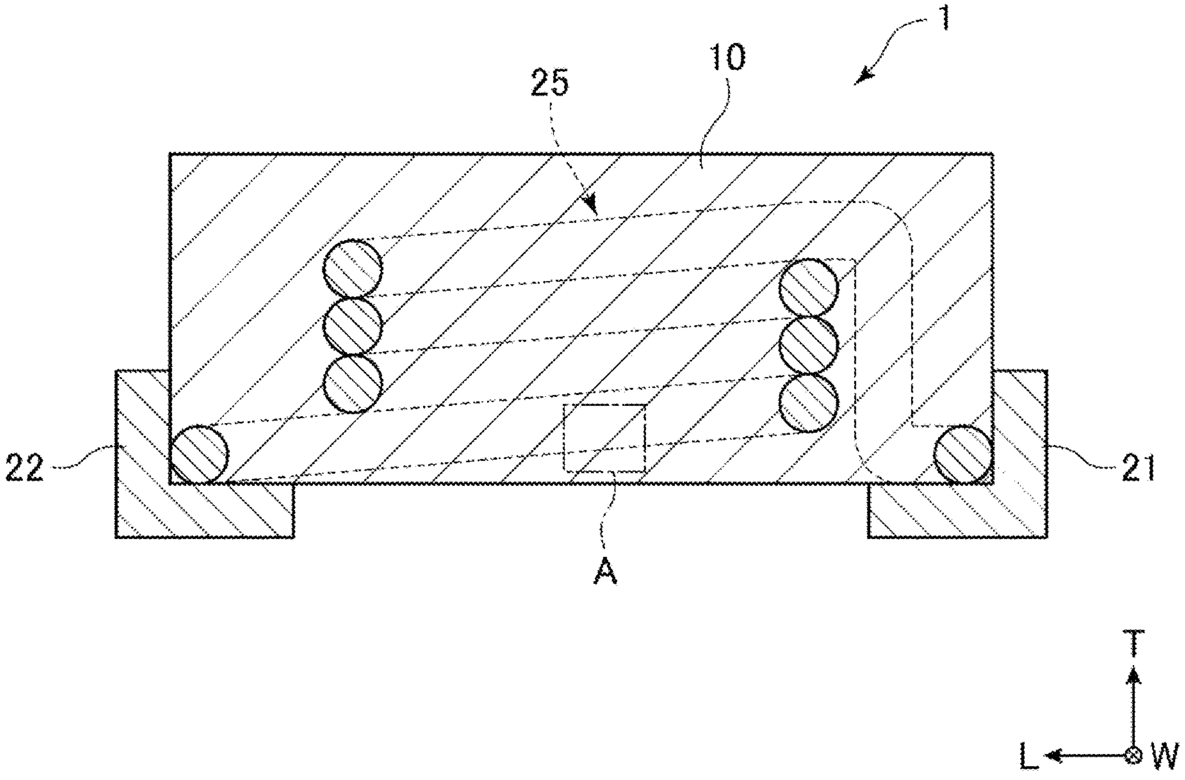
FIG. 2 is a sectional view schematically showing a sectional surface of the coil component of FIG. 1 cut along the line I-I.

A coil component 1 according to one embodiment of the invention will be hereinafter described with reference to FIGS. 1 and 2. FIG. 1 is a schematic perspective view of the coil component 1, and FIG. 2 is a schematic sectional view showing a sectional surface of the coil component 1 cut along the line I-I. As shown, the coil component 1 includes a base body 10, a coil conductor 25 provided in the base body 10, an external electrode 21 disposed on a surface of the base body 10, and an external electrode 22 disposed on a surface of the base body 10 at a position spaced from the external electrode 21. The base body 10 contains a magnetic material. Therefore, the base body 10 may be referred to as the magnetic base body 10 herein. In FIG. 1, the magnetic base body 10 appears transparent, such that the coil conductor 25 provided in the magnetic base body 10 is shown.

The arrangement, dimensions, shapes, and other aspects of the members may be herein described based on the L axis, the W axis, and the T axis shown in FIGS. 1 and 2. The "length" direction, the "width" direction, and the "thickness" direction of the coil component 1 may herein refer to the L axis direction, the W axis direction, and the T axis direction in FIG. 1, respectively. The "thickness" direction is also referred to as the "height" direction.

The coil component 1 may be mounted on a mounting substrate 2*a*. The mounting substrate 2*a* has land portions 3*a*, 3*b* provided thereon. The coil component 1 is mounted on the mounting substrate 2*a* by connecting the external electrode 21 to the land portion 3*a* and connecting the external electrode 22 to the land portion 3*b*. A circuit board 2 relating to one embodiment of the present invention includes the coil component 1 and the mounting substrate 2*a* having the coil component 1 mounted thereon. The circuit board 2 can be installed in various electronic devices. The electronic devices in which the circuit board 2 may be installed include smartphones, tablets, game consoles, electrical components of automobiles, a server and various other electronic devices.

The coil component 1 may be an inductor, a transformer, a filter, a reactor and any one of various other coil components. The coil component 1 may alternatively be a coupled inductor, a choke coil, and any one of various other magnetically coupled coil components. The coil component 1 may be, for example, a power inductor used in a DC/DC converter. Applications of the coil component 1 are not limited to those explicitly described herein.

The magnetic base body 10 is made of a magnetic material and formed in a rectangular parallelepiped shape as a whole. In one embodiment of the invention, the magnetic base body 10 has a length (the dimension in the L axis direction) of 1.0 to 6.0 mm, a width (the dimension in the W axis direction) of 1.0 to 6.0 mm, and a height (the dimension in the T axis direction) of 1.0 to 5.0 mm. The dimensions of the magnetic base body 10 are not limited to those specified herein. The term "rectangular parallelepiped" or "rectangular parallelepiped shape" used herein is not intended to mean solely "rectangular parallelepiped" in a mathematically strict sense. The dimensions and the shape of the magnetic base body 10 are not limited to those specified herein.

The magnetic base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 is defined by these six surfaces. The first principal surface 10*a* and the second principal surface 10*b* are at the opposite ends in the height direction, the first end surface 10*c* and the second end surface 10*d* are at the opposite ends in the length direction, and the first side surface 10*e* and the second side surface 10*f* are at the opposite ends in the width direction.

As shown in FIG. 1, the first principal surface 10*a* lies on the top side of the magnetic base body 10, and therefore, the first principal surface 10*a* may be herein referred to as "the top surface." Likewise, the second principal surface 10*b* may be referred to as "the bottom surface." The coil component 1 is disposed such that the second principal surface 10*b* faces the mounting substrate 2*a*, and therefore, the second principal surface 10*b* may be herein referred to as "the mounting surface." The top-bottom direction of the coil component 1 mentioned herein refers to the top-bottom direction in FIG. 1.

In one embodiment of the present invention, the external electrode 21 extends on the mounting surface 10*b* and the end surface 10*c* of the magnetic base body 10. The external electrode 22 extends on the mounting surface 10*b* and the end surface 10*d* of the magnetic base body 10. The shapes and positions of the external electrodes 21, 22 are not limited to those in the example shown. The external electrodes 21 and 22 are separated from each other in the length direction.

The coil conductor 25 is wound spirally around a coil axis Ax extending in the thickness direction (the T-axis direction). The coil conductor 25 is connected at one end thereof to the external electrode 21 and connected at the other end thereof to the external electrode 22. In the illustrated embodiment, only the opposite ends of the coil conductor 25 are exposed on the magnetic base body 10 and the remaining portion is positioned within the magnetic base body 10. In this way, at least a part of the coil conductor 25 is covered by the magnetic base body 10. In the illustrated embodiment, the coil axis Ax intersects the first and second principal surfaces 10*a* and 10*b*, but does not intersect the first and second end surfaces 10*c* and 10*d* and the first and second side surfaces 10*e* and 10*f*. In other words, the first and second end surfaces 10*c* and 10*d* and the first and second side surfaces 10*e* and 10*f* extend along the coil axis Ax. FIG. 2 shows a sectional surface of the magnetic base body 10 cut along a plane extending through the coil axis Ax.

Figure 3:
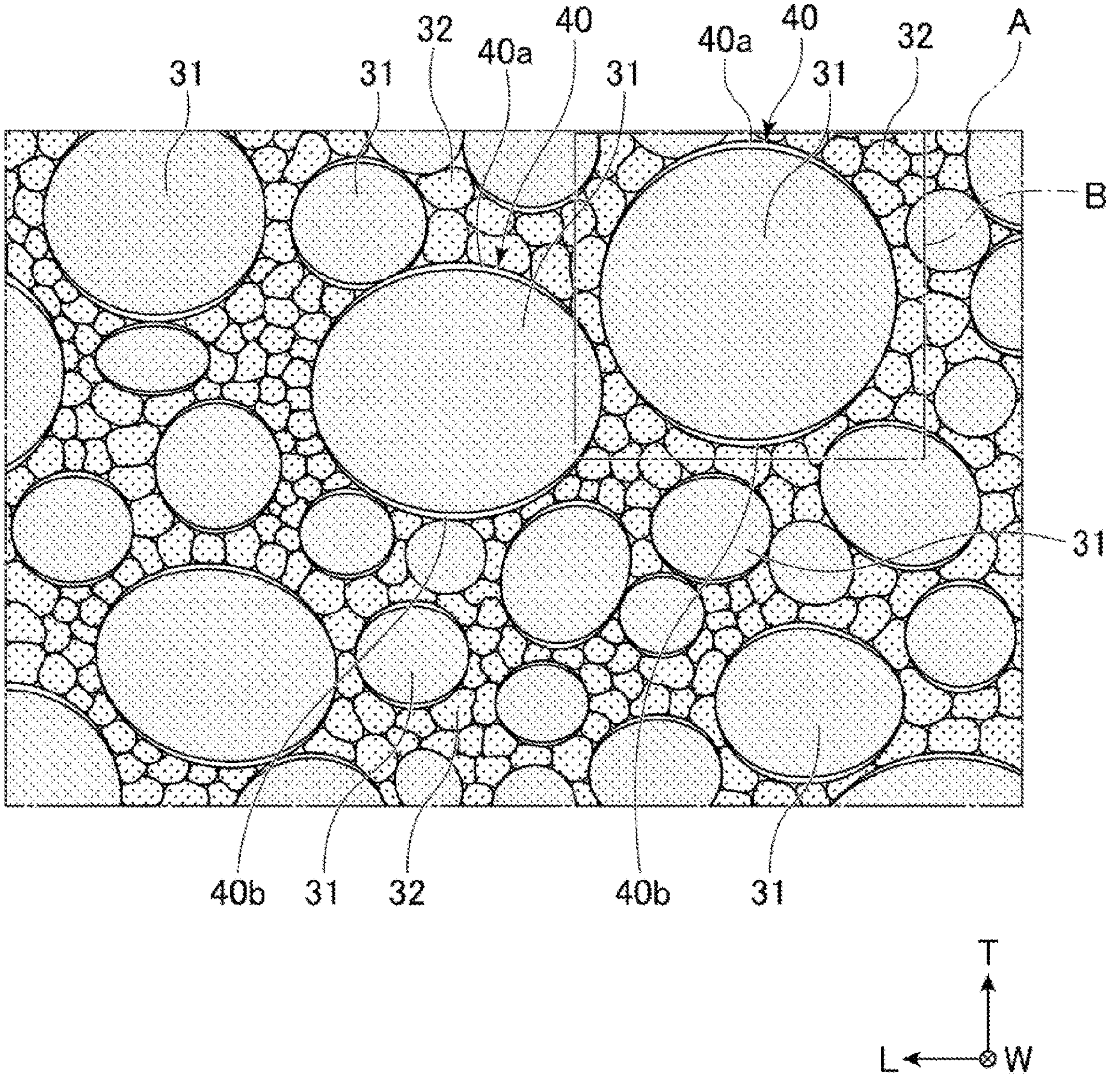
FIG. 3 is an enlarged schematic view of a region A of the magnetic base body of FIG. 2.
Figure 4:
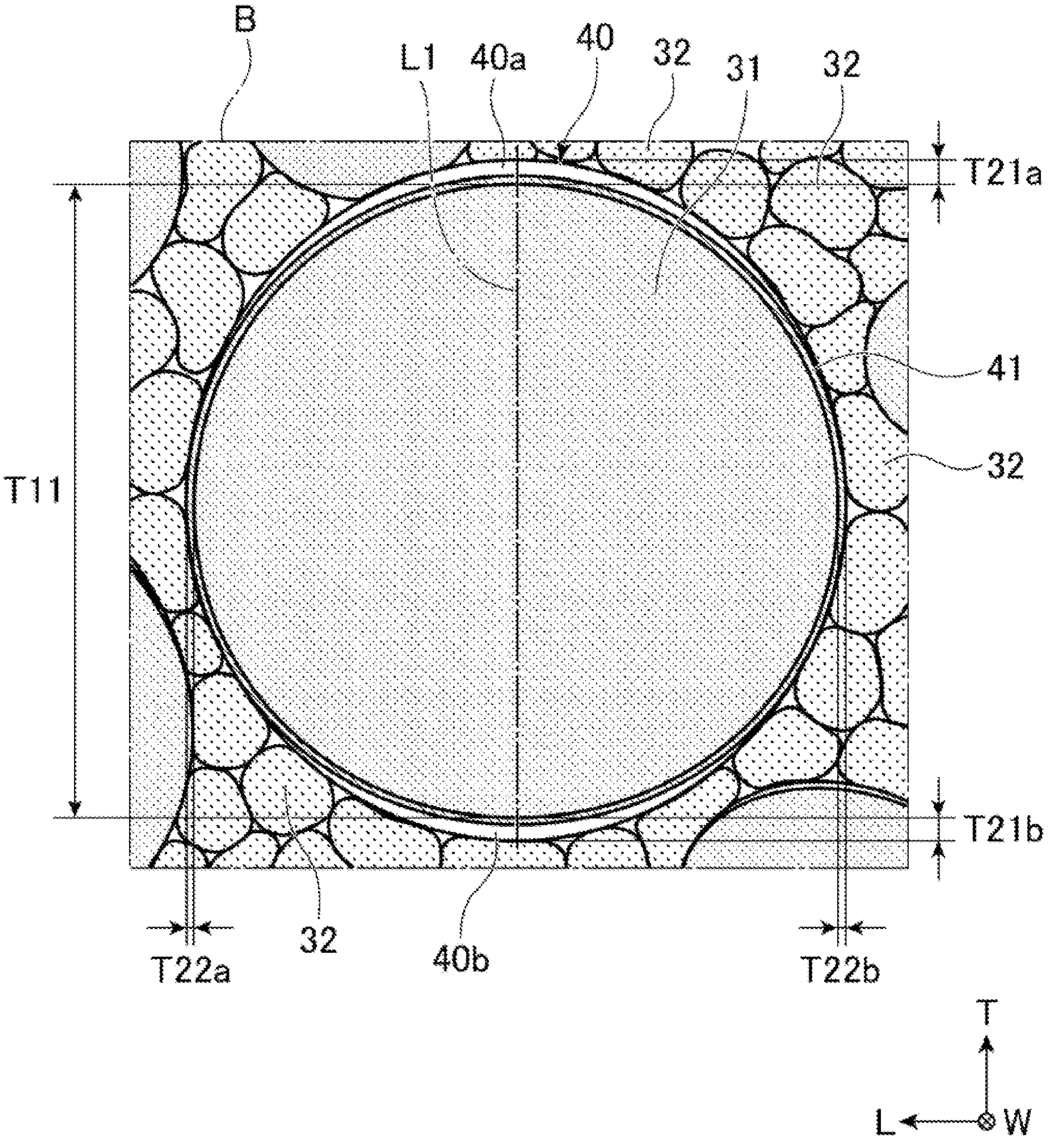
FIG. 4 is an enlarged schematic view of a region B of the magnetic base body of FIG. 3, showing a magnetic gap portion 40 in one embodiment of the invention.

In one embodiment of the present invention, the magnetic base body 10 is made of a magnetic material containing a plurality of types of metal magnetic particles. The microstructure of the magnetic base body 10 will now be described with reference to FIGS. 3 and 4. FIG. 3 is an enlarged schematic view of the region A in the sectional surface of the magnetic base body 10 shown in FIG. 2, and FIG. 4 is an enlarged schematic view of the region B in the sectional surface of the magnetic base body 10 shown in FIG. 3. As shown in FIG. 3, the magnetic base body 10 relating to one embodiment contains a plurality of first metal magnetic particles 31 and a plurality of second metal magnetic particles 32. Since the sectional surface of the magnetic base body 10 contains a large number of first and second metal magnetic particles 31 and 32, only a part of the first and second metal magnetic particles 31 and 32 shown in FIGS. 3 and 4 is denoted with a reference sign. An insulating film may be provided on the surfaces of the first and second metal magnetic particles 31 and 32. In this case, adjacent metal magnetic particles are bonded to each other via the insulating films. Also, the insulating films electrically insulate the adjacent metal magnetic particles from one another. As will be described later, the insulating films may be oxide films containing oxides of elements constituting the metal magnetic particles. Adjacent ones of the plurality of first metal magnetic particles 31 and the plurality of second metal magnetic particles 32 may be bound to one another with an insulating binder. When it is not necessary to distinguish between the first metal magnetic particles 31 and the second metal magnetic particles 32, the first metal magnetic particle 31 and the second metal magnetic particles 32 may be herein collectively referred to simply as "the metal magnetic particles."

The first metal magnetic particles 31 and the second metal magnetic particles 32 are made of soft magnetic materials. In one embodiment, the first metal magnetic particles 31 and the second metal magnetic particles 32 are made of soft magnetic materials composed mainly of Fe. Specifically, the first and second metal magnetic particles 31 and 32 are particles of (1) a metal such as Fe or Ni, (2) a crystalline alloy such as an Fe—Si—Cr alloy, an Fe—Si—Al alloy, an Fe—Si alloy, or an Fe—Ni alloy, (3) an amorphous alloy such as an Fe—Si—B alloy, an Fe—Si—Cr—B—C alloy, or an Fe—Si—Cr—B alloy, or (4) a mixture thereof. The composition of the metal magnetic particles contained in the magnetic base body 10 is not limited to those described above.

The materials of the first metal magnetic particles 31 and the second metal magnetic particles 32 are selected such that the elastic limit of the material of the first metal magnetic particles 31 is larger than that of the material of the second metal magnetic particles 32, and the relative permeability of the material of the first metal magnetic particles 31 is larger than that of the material of the second metal magnetic particles 32. The "elastic limit" of the metal magnetic particles refers to a limit of a stress at which the metal magnetic particles loaded and deformed can return to original shape thereof when unloaded. In accordance with the normal usage of those skilled in the art, deformation that results in 0.02% or smaller permanent strain remaining in the dimensions after unloading relative to the dimensions before loading is determined to be deformation within the elastic limit.

An Fe-based amorphous alloy can be used as the material of the first metal magnetic particles 31. Amorphous materials have a high elastic limit because of their random atomic structure. As described above, amorphous alloys that can be used as the material of the first metal magnetic particles 31 include an Fe—Si—B amorphous alloy, an Fe—Si—Cr—B—C amorphous alloy, and an Fe—Si—Cr—B amorphous alloy. The materials of the second metal magnetic particles 32 may include pure metal particles. When any of the above amorphous alloys is used as the material of the first metal magnetic particles 31, the material of the second metal magnetic particles 32 may be, for example, carbonyl iron or pure Ni. Carbonyl iron and pure Ni are soft and have a lower elastic limit than the Fe-based amorphous alloy particles. In particular, the Fe—Si—B amorphous alloy, the Fe—Si—Cr—B—C amorphous alloy, and the Fe—Si—Cr—B amorphous alloy mentioned above have a higher relative permeability than carbonyl iron and pure Ni.

The materials of the first metal magnetic particles 31 and the second metal magnetic particles 32 may be alloys containing the same types of metal elements at different ratios. For example, both the first metal magnetic particles 31 and the second metal magnetic particles 32 may be Fe—Si alloy particles. In this case, the proportion of Si in the first metal magnetic particles 31 may be higher than that in the second metal magnetic particles 32, such that the elastic limit of the first metal magnetic particles 31 is larger than that of the second metal magnetic particles 32, and the relative permeability of the material of the first metal magnetic particles 31 is higher than that of the material of the second metal magnetic particles 32. In one embodiment, both the first metal magnetic particles 31 and the second metal magnetic particles 32 may be Fe—Si—Cr alloy particles. In one embodiment, both the first metal magnetic particles 31 and the second metal magnetic particles 32 may be Fe—Si—Al alloy particles. In these cases, the proportion of Si in the first metal magnetic particles 31 may be higher than that in the second metal magnetic particles 32, such that the elastic limit of the first metal magnetic particles 31 is larger than that of the second metal magnetic particles 32, and the relative permeability of the material of the first metal magnetic particles 31 is higher than that of the material of the second metal magnetic particles 32.

In this way, the first metal magnetic particles 31 and the second metal magnetic particles 32 contain different types of elements or contain the same types of elements in different compositions, and therefore, the first metal magnetic particles 31 and the second metal magnetic particles 32 can be distinguished from each other by performing energy dispersive X-ray spectroscopy (EDS) on the SEM image of the sectional surface of the magnetic base body 10. For example, it is possible that the composition of each particle is analyzed with EDS, and particles with a molar proportion of iron lower than a predetermined value are determined to be the first metal magnetic particles 31. It is also possible that the composition of each particle is analyzed with EDS, and particles with a molar proportion of Si higher than a predetermined value may be determined to be the first metal magnetic particles 31.

In one embodiment, the average particle size of the second metal magnetic particles 32 may be smaller than that of the plurality of first metal magnetic particles 31 contained in the magnetic base body 10. In one embodiment, the average particle size of the second metal magnetic particles 32 may be ½ or less, ⅓ or less, ¼ or less, ⅕ or less, $\frac{3}{20}$ or less, or $\frac{1}{10}$ or less of the average particle size of the first metal magnetic particles 31. The average particle sizes of the first metal magnetic particles 31 and the second metal magnetic particles 32 are determined in the following manner. The magnetic base body 10 is cut along the thickness direction (the T axis direction) to expose a sectional surface. The sectional surface is photographed using a scanning electron microscope (SEM) to obtain a SEM image, and the particle size distribution is determined based on the SEM image. The particle size distribution is used to determine the average particle sizes. For example, the 50th percentile (D50) of the particle size distribution obtained based on the SEM image can be used as the average particle size of the metal magnetic particles. The average particle size of the first metal magnetic particles 31 may be, for example, 1 μm to 50 μm, and the average particle size of the second metal magnetic particles 32 may be, for example, 0.1 μm to 20 μm. When the second metal magnetic particles 32 have a smaller average particle size than the first metal magnetic particles 31, the second metal magnetic particles 32 can easily intervene between the adjacent two of the first metal magnetic particles 31. Consequently, the magnetic base body 10 can achieve a higher filling factor (or density) of the metal magnetic particles.

In one embodiment of the present invention, the volume proportion of the entire volume of the first metal magnetic particles 31 to the total volume of the first metal magnetic particles 31 and the second metal magnetic particles 32 may be 10 to 65 vol %.

The metal magnetic particles contained in the magnetic base body 10 are not limited to the first metal magnetic particles 31 and the second metal magnetic particles 32. The magnetic base body 10 may contain third metal magnetic particles. The elastic limit of the third metal magnetic particles is lower than that of the first metal magnetic particles 31, and the elastic limit and the relative permeability of the third metal magnetic particles are different from those of the first metal magnetic particles 31 and the second metal magnetic particles 32.

The magnetic base body 10 may be prepared as follows. A mixture of particles including a plurality of first metal magnetic particles 31 and a plurality of second metal magnetic particles 32 is mixed and kneaded with a resin and a diluting solvent to form a mixed resin composition. The mixed resin composition is placed into a mold, and a molding pressure is applied to the mixed resin composition in the mold to form a molded body. The molded body is then heat-treated to form the magnetic base body 10. The molding pressure is applied in the direction of the coil axis Ax of the coil conductor 25 (the T-axis direction in the embodiment shown). For example, the coil conductor 25 may be placed in the mold such that the coil axis Ax of the coil conductor 25 is parallel with the pressurizing direction, and then insert molding may be performed. Thus, the molding pressure can be applied in the direction of the coil axis Ax of the coil conductor 25.

The resin in the mixed resin composition may be a thermosetting resin. When the resin is set by the heat treatment, the resin may serve as a binder that binds together adjacent ones of the first metal magnetic particles 31 and the second metal magnetic particles 32. In this case, the set resin fills at least a part of the gaps between the first metal magnetic particles 31 and the second metal magnetic particles 32 in the magnetic base body 10. The resin in the mixed resin composition may be thermally decomposed by the heat treatment. In this case, the finished magnetic base body 10 may not contain the resin in the resin composition.

Each of the first metal magnetic particles 31 is encircled by a magnetic gap portion 40 formed of a low permeability material having a lower relative permeability than the material of the first metal magnetic particles 31. The presence of the magnetic gap portion 40 around the first metal magnetic particle 31 enlarges the intervals between the first metal magnetic particle 31 and the metal magnetic particles (the first metal magnetic particles 31 and/or the second metal magnetic particles 32) adjacent to the first metal magnetic particle 31, as compared to the case where the magnetic gap portion 40 is absent. In other words, the magnetic gap portion 40 intervenes between the first metal magnetic particle 31 and the metal magnetic particles adjacent to the first metal magnetic particle 31. The magnetic gap portion 40 is provided to cover the surface of the first metal magnetic particle 31. The magnetic gap portion 40 may include a first magnetic gap component and a second magnetic gap component. The first magnetic gap component is located on at least one of the opposite ends of the first metal magnetic particle 31 in the T-axis direction (i.e., the pressurizing direction), and the second magnetic gap component covers the entire surface of the first metal magnetic particle 31. The second magnetic gap component that covers the surface of the first metal magnetic particle 31 may be provided inside the first magnetic gap component in the radial direction of the first metal magnetic particle 31. The second metal magnetic particles 32 may be in direct contact with the surface of the first metal magnetic particle 31. The first magnetic gap component may be in direct contact with the first metal magnetic particle 31 when the second gap component is absent. In the embodiment shown, an insulating film 41 as the second magnetic gap component is provided on the entire surface of the first metal magnetic particle 31, and the insulating film 41 intervenes between the first metal magnetic particle 31 and first magnetic gap components 40*a*, 40*b*. The first magnetic gap component 40*a* is provided on the end of the first metal magnetic particle 31 on the positive side in the T-axis direction (i.e., the pressurizing direction), and the first magnetic gap component 40*b* is provided on the end of the first metal magnetic particle 31 on the negative side. In this way, the first magnetic gap component provided on one first metal magnetic particle 31 may be divided into the first magnetic gap component 40*a* on one end in the T-axis direction and the first magnetic gap component 40*b* on the other end. For the same purpose as the reference sign "31" is partly omitted, only a part of the first magnetic gap components 40*a*, 40*b* is denoted with the respective reference sign in FIGS. 3 and 4.

Each of the first magnetic gap components 40*a*, 40*b* may be formed of a gap or a resin. It is also possible that a part of the first magnetic gap components 40*a*, 40*b* is formed of a gap and another part thereof is formed of a resin. In this case, the gap and the resin are put together to form the first magnetic gap component 40*a* or the first magnetic gap component 40*b*.

As described above, in the embodiment shown, the second magnetic gap component is the insulating film 41 that covers the entire surface of the first metal magnetic particle 31. The insulating film 41 may be an oxide film formed of oxides of elements contained in the first metal magnetic particle 31 (e.g., Fe, Cr, Si, Cr, or Al). The oxides of the elements contained in the first metal magnetic particles 31 have a lower relative permeability than the elements themselves. The insulating film containing the oxides of the elements contained in the first metal magnetic particle 31 may be formed in the surface of the first metal magnetic particle 31 during the heat treatment in the manufacturing process of the coil component 1. The insulating film 41 included in the metal magnetic particle may be a coating film formed of an insulating material. The coating film may be a thin film containing silicon oxide formed on the surface of the first metal magnetic particle 31 through a coating process using, for example, the sol-gel method. The coating film made of silicon oxide is formed on the surface of the metal magnetic particle by the sol-gel method as follows. First, a process solution containing TEOS (tetraethoxysilane, $Si(OC_2H_5)_4$), ethanol, and water is mixed into a mixed solution containing metal magnetic particles, ethanol, and aqueous ammonia to prepare a mixture. Then, the mixture is stirred and then filtered. This separates from the mixture the metal magnetic particles that have a silicon oxide film formed on their surface.

The magnetic gap portion 40 may optionally include the second magnetic gap component. For example, when the metal magnetic particles are bound together via an insulating binder formed of a thermosetting resin, the first metal magnetic particle 31 does not necessarily have the insulating film 41 on the surface thereof. In this case, the magnetic gap portion 40 may not include the second magnetic gap component.

The magnetic gap portion 40 may be formed of any one of other low permeability materials having a lower relative permeability than the material of the first metal magnetic particle 31.

In one embodiment of the present invention, both the thicknesses T21*a*, T21*b* of the magnetic gap portion 40 in the T-axis direction are from 0.5% to 4.0%, both inclusive, of the thickness T11 of the first metal magnetic particle 31 in the T-axis direction. Both the thicknesses T21*a*, T21*b* of the magnetic gap portion 40 may be in the range from 100 nm to 3000 nm. The thickness T21*a* refers to the length for which a straight line extending along the line segment L1 intersects with the magnetic gap portion 40 on the positive side in the T-axis direction. The line segment L1 is the longest line segment that is parallel with the T-axis and overlaps the sectional surface of the first metal magnetic particle 31. For example, in the embodiment shown in FIG. 4, the thickness T21*a* of the magnetic gap portion 40 is the sum of the thickness of the insulating film 41 in the T-axis direction and the thickness of the first magnetic gap component 40*a* in the T-axis direction. Likewise, the thickness T21*b* refers to the length for which a straight line extending along the line segment L1 intersects with the magnetic gap portion 40 on the negative side in the T-axis direction. For example, in the embodiment shown in FIG. 4, the thickness T21*b* of the magnetic gap portion 40 is the sum of the thickness of the insulating film 41 in the T-axis direction and the thickness of the first magnetic gap component 40*b* in the T-axis direction. Since the magnetic base body 10 contains a plurality of first metal magnetic particles 31, and the thicknesses 21*a*, 21*b* of the magnetic gap portion 40 provided on the ends of the first metal magnetic particles 31 in the T-axis direction may vary for each first metal magnetic particle 31, the thicknesses 21*a*, 21*b* of the magnetic gap portion 40 are herein determined as follows. First, the magnetic base body 10 is cut along the T-axis direction to expose a sectional surface. The sectional surface is photographed with a scanning electron microscope (SEM) at a predetermined magnification to obtain a SEM image. The SEM image is analyzed with EDS to determine the composition of the particles included in the SEM image. Among all the particles included in the SEM image, 20 particles are selected in the ascending order of the molar proportion of iron as the first metal magnetic particles 31 to be measured. The magnification for the measurement can be set such that the longitudinal and transverse dimensions of the observed field are three to ten times as large as the diameter of the largest first metal magnetic particle 31 included in the SEM image. The dimensions T21*a*, T21*b* defined as described above are measured for each of the 20 first metal magnetic particles 31 selected for the measurement. The average value of the dimension T21*a* measured for the 20 first metal magnetic particles 31 selected for the measurement is set as the dimension T21*a* of the magnetic gap portion 40 of the magnetic base body 10 in the T-axis direction. Likewise, the average value of the dimension T21*b* measured for the 20 first metal magnetic particles 31 selected for the measurement is set as the dimension T21*b* of the magnetic gap portion 40 of the magnetic base body 10 in the T-axis direction. In the SEM image, the metal magnetic particles, the insulating film 41, and the first magnetic gap components 40*a*, 40*b* can be distinguished from each other by the difference in brightness. Some of the first metal magnetic particles 31 selected for the measurement may not have the magnetic gap portion 40 observed at the ends thereof in the T-axis direction. Some of the first metal magnetic particles 31 may not have the magnetic gap portion 40 formed at the ends thereof in the T-axis direction, and some of the first metal magnetic particles 31 have the magnetic gap portion 40 at the ends thereof in the T-axis direction, but when the cutting position for exposing the sectional surface is off the center of the first metal magnetic particles 31, the magnetic gap portion 40 may not be observed. The first metal magnetic particles 31 with no magnetic gap portion 40 may be included for the calculation of the average values with the dimensions T21*a*, T21*b* thereof set at zero.

In one embodiment of the present invention, the magnetic gap portion 40 is configured such that the thicknesses T21*a*, T21*b* thereof in the T-axis direction are larger than the thicknesses thereof in a direction perpendicular to the T-axis direction. FIG. 4 shows the thicknesses T22*a*, T22*b* of the magnetic gap portion 40 in the L-axis direction perpendicular to the T-axis direction. The magnetic gap portion 40 is configured such that the thicknesses T21*a*, T21*b* thereof in the T-axis direction are larger than the thicknesses T22*a*, T22*b* thereof in the L-axis direction perpendicular to the T-axis direction. Although the thicknesses of the magnetic gap portion 40 in the W-axis direction are not shown, the W-axis direction is also perpendicular to the T-axis direction, and therefore, the thicknesses of the magnetic gap portion 40 in the W-axis direction are smaller than the thicknesses T21*a*, T21*b* thereof in the T-axis direction. The thicknesses T22*a*, T22*b* of the magnetic gap portion 40 in the L-axis direction are defined and measured in the same manner as the thicknesses T21*a*, T21*b* thereof in the T-axis direction. As will be described below, the ends of the first metal magnetic particle 31 in the L-axis direction are not covered by the first magnetic gap components 40*a*, 40*b*, and therefore, the thicknesses T22*a*, T22*b* of the magnetic gap portion 40 in the L-axis direction are equal to the thickness of the insulating film 41 in the L-axis direction. The insulating film 41 may have a substantially uniform thickness over the entire circumference of the first metal magnetic particle 31. In one embodiment of the present invention, the thickness of the insulating film 41 (which is equal to the thicknesses T22*a*, T22*b* of the magnetic gap portion 40 in the L-axis direction) is less than 100 nm.

Next, the first magnetic gap components 40*a*, 40*b* will be further described with further reference to FIG. 4. The first magnetic gap component 40*a* is provided on the positive side of the first metal magnetic particle 31 in the T-axis direction, and the first magnetic gap component 40*b* is provided on the negative side of the first metal magnetic particle 31 in the T-axis direction. Each of the first magnetic gap components 40*a*, 40*b* is in contact with the first metal magnetic particle 31 via the insulating film 41 or in a direct manner and covers a part, not all, of the surface of the first metal magnetic particle 31. The first magnetic gap component 40*a* covers a region of the surface of the first metal magnetic particle 31 including the end on the positive side in the T-axis direction, and the first magnetic gap component 40*b* covers a region of the surface of the first metal magnetic particle 31 including the end on the negative side in the T-axis direction. Each of the first magnetic gap components 40*a*, 40*b* extends in the circumferential direction of the first metal magnetic particle 31 for a length of 1/16 or larger and less than 1/2 of the circumference of the first metal magnetic particle 31. When the lengths of the first magnetic gap components 40*a*, 40*b* in the circumferential direction of the first metal magnetic particle 31 are less than 1/16 of the circumference of the first metal magnetic particle 31, the first magnetic gap components 40*a*, 40*b* do not function well as magnetic gaps. On the other hand, when the lengths of the first magnetic gap components 40*a*, 40*b* are 1/2 or larger of the circumference of the first metal magnetic particle 31, the first metal magnetic particle 31 is encircled by the magnetic gap, and thus less magnetic flux passes through the first metal magnetic particle 31, resulting in a degraded inductance. Therefore, in order to inhibit the degradation of the inductance and ensure the function as the magnetic gap, the lengths of the first magnetic gap components 40*a*, 40*b* in the circumferential direction of the first metal magnetic particle 31 should be 1/16 or larger and less than 1/2 of the circumference of the first metal magnetic particle 31.

None of the first magnetic gap components 40*a*, 40*b* is provided on the ends of the first metal magnetic particle 31 in the L-axis direction. In the embodiment shown, the opposite ends of the first metal magnetic particle 31 in the L-axis direction are in contact with the second metal magnetic particles 32 via the insulating film 41. When one first metal magnetic particle 31 is adjacent to another first metal magnetic particle 31, at least one of the ends of the one first metal magnetic particle 31 in the L-axis direction may be in contact with the other first metal magnetic particle 31 via the insulating films 41.

Since the magnetic base body 10 in the embodiment of the present invention includes the first magnetic gap components 40*a*, 40*b*, it is possible to achieve both a high permeability and high DC superposition characteristics, as follows. In conventional coil components, metal magnetic particles are filled densely to increase the permeability, and therefore, the magnetic base body contains no portion corresponding to the first magnetic gap components 40*a*, 40*b*. In some conventional coil components, an insulating film is provided on the surface of metal magnetic particles in the magnetic base body, but the insulating film is formed on the surface of the metal magnetic particles to have a uniform thickness in the circumferential direction of the metal magnetic particles, and the insulating film is not formed to have a larger thickness in the coil axis direction (corresponding to the T-axis direction) than in the direction perpendicular to the coil axis direction. Thus, in conventional coil components, the magnetic base body contains no portion corresponding to the first magnetic gap components 40*a*, 40*b*. When two types of metal magnetic particles made of materials having different relative permeabilities are filled densely in a magnetic base body, the magnetic flux generated when an electric current flows through the coil conductor preferably passes through a magnetic path containing a large number of high permeability particles formed of a magnetic material having a high relative permeability. Therefore, as the direct current running through the coil conductor increases, magnetic saturation occurs sequentially from a magnetic path with a higher proportion of the high permeability particles among a plurality of magnetic paths within the magnetic base body through which the magnetic flux passes. In the embodiment of the present invention, the first metal magnetic particles 31 have a higher relative permeability than the second metal magnetic particles 32, and the first magnetic gap components 40*a*, 40*b* are provided on at least one of the ends of the first metal magnetic particles 31 in the T-axis direction. Therefore, it is possible to inhibit the magnetic saturation from occurring in magnetic paths containing a large number of high permeability particles. In addition, the first magnetic gap components 40*a*, 40*b*, which are provided on the circumference of the first metal magnetic particles 31, are positioned on the ends in the T-axis direction that is parallel with the coil axis Ax, not on the ends in the direction perpendicular to the T-axis direction. Therefore, the magnetic gap does not encircle the entire circumference of the high permeability particles, and thus it is possible to inhibit the reduction of inductance caused by the first magnetic gap components 40*a*, 40*b*. With the magnetic base body 10 in the embodiment of the present invention, it is possible to achieve both a high permeability and high DC superposition characteristics.

In one embodiment of the present invention, the magnetic base body 10 may contain a binder that binds together the metal magnetic particles. The binder is, for example, a highly insulating thermosetting resin. The binder is made of a resin material having lower permeability than the material of the first metal magnetic particles 31. Examples of the resin material for the binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

Figure 5:
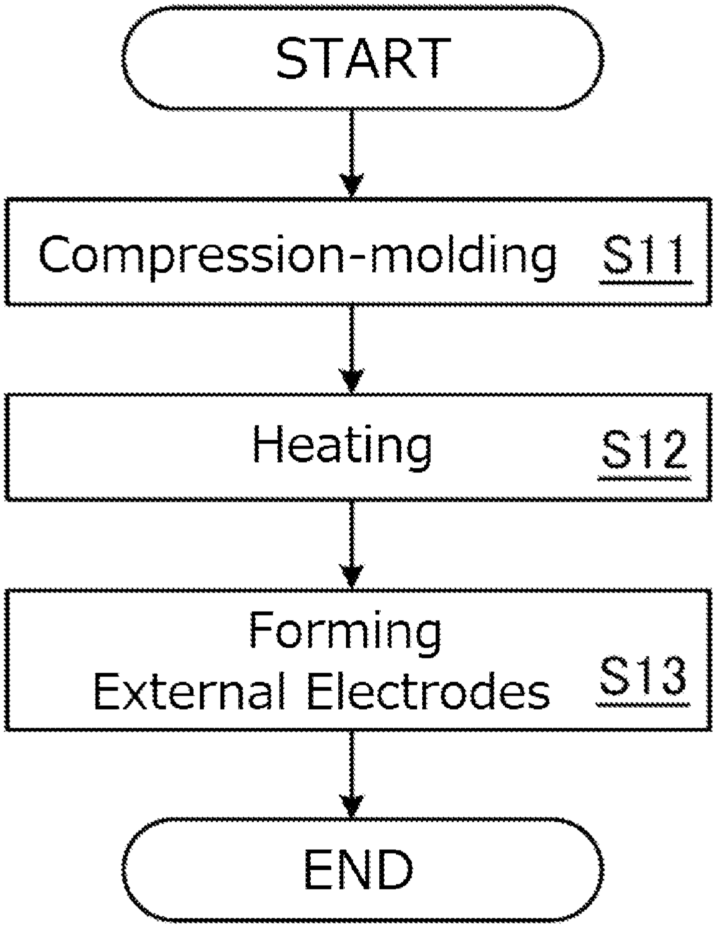
FIG. 5 is a flowchart showing a method of manufacturing a coil component according to one embodiment of the present invention.

An example method of manufacturing the coil component 1 according to one embodiment of the invention will now be described with reference to FIG. 5. FIG. 5 illustrates the example method of manufacturing the coil component 1 according to one embodiment of the invention. In the manufacturing method illustrated in FIG. 5, the coil component 1 is manufactured by the compression molding process.

First, for preparation, a particle mixture of a plurality of first metal magnetic particles 31 and a plurality of second metal magnetic particles 32 is mixed and kneaded with a resin and a diluting solvent, thereby making a resin composition mixture. The resin may be an epoxy resin, a polyvinyl butyral (PVB) resin, or any other known resins.

Following this, in step S11, the coil conductor 25, which is prepared in advance, is placed in a cavity of a mold, the resin composition mixture made in the above manner is filled into the mold having the coil conductor 25 therein, and a molding pressure is then applied by a punch to the resin composition mixture in the mold. In this manner, a molded body enclosing therein the coil conductor 25 is fabricated. The coil conductor 25 is placed in the cavity of the mold such that the coil axis Ax corresponds or substantially corresponds to the direction of a stroke of the punch (the pressurizing direction). When the angle between the coil axis and the direction of a stroke of the punch is 30 degrees or smaller, it can be determined that the coil axis Ax corresponds or substantially corresponds to the pressurizing direction.

In the compression molding of step S11, the resin composition mixture is compression-molded with a molding pressure smaller than the elastic limit of the first metal magnetic particles 31 and larger than the elastic limit of the second metal magnetic particles 32, to fabricate a molded body. In the compression molding of step S11, the molding pressure causes elastic deformation of the first metal magnetic particles 31 and plastic deformation of the second metal magnetic particles 32. A specific example of the molding pressure, which varies depending on the materials of the first metal magnetic particles 31 and the second metal magnetic particles 32, may be 5 to 15 ton/cm$^2$. For example, when the first metal magnetic particles 31 are formed of Fe—Si—Cr—B amorphous alloy and the second metal magnetic particles 32 are formed of carbonyl iron, the compression molding may be performed with a molding pressure of 5 to 12 ton/cm$^2$.

Figure 6A:
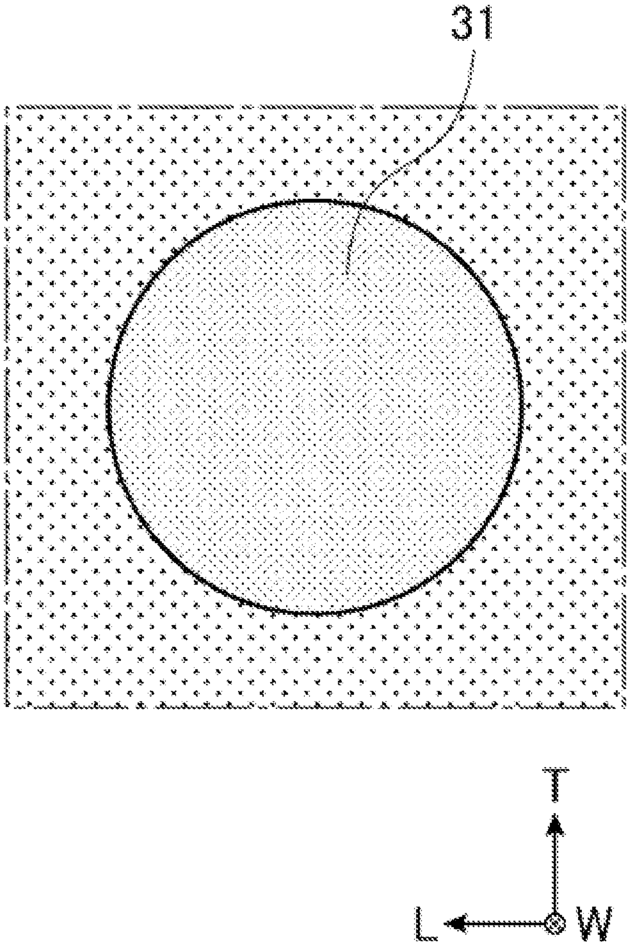
FIGS. 6A to 6C are schematic views illustrating elastic deformation of a first metal magnetic particle in compression molding.
Figure 6B:
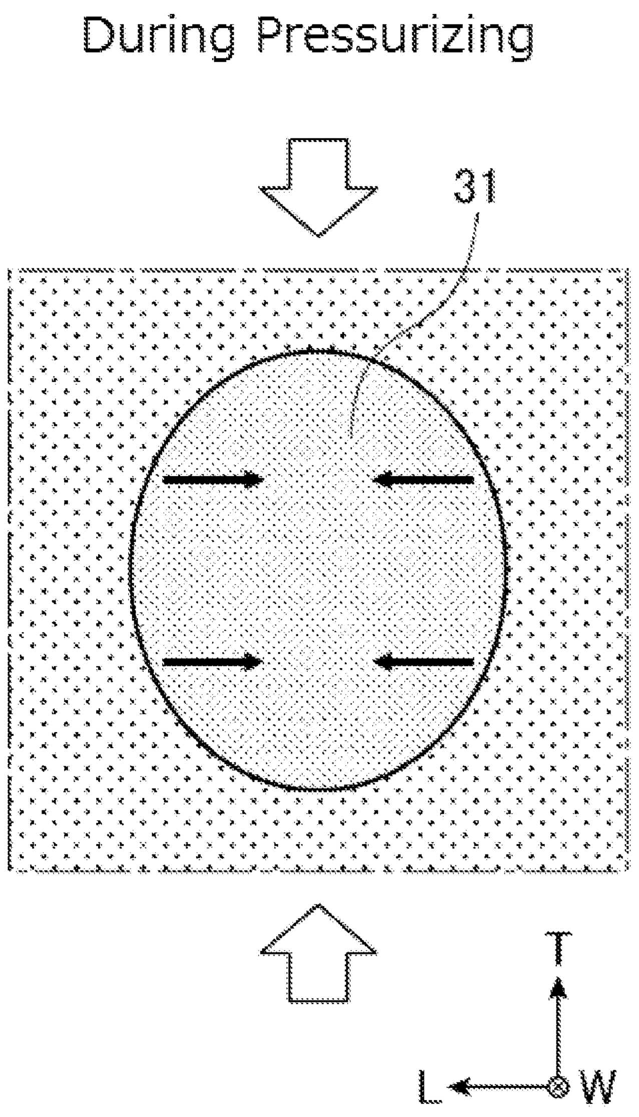
Figure 6C:
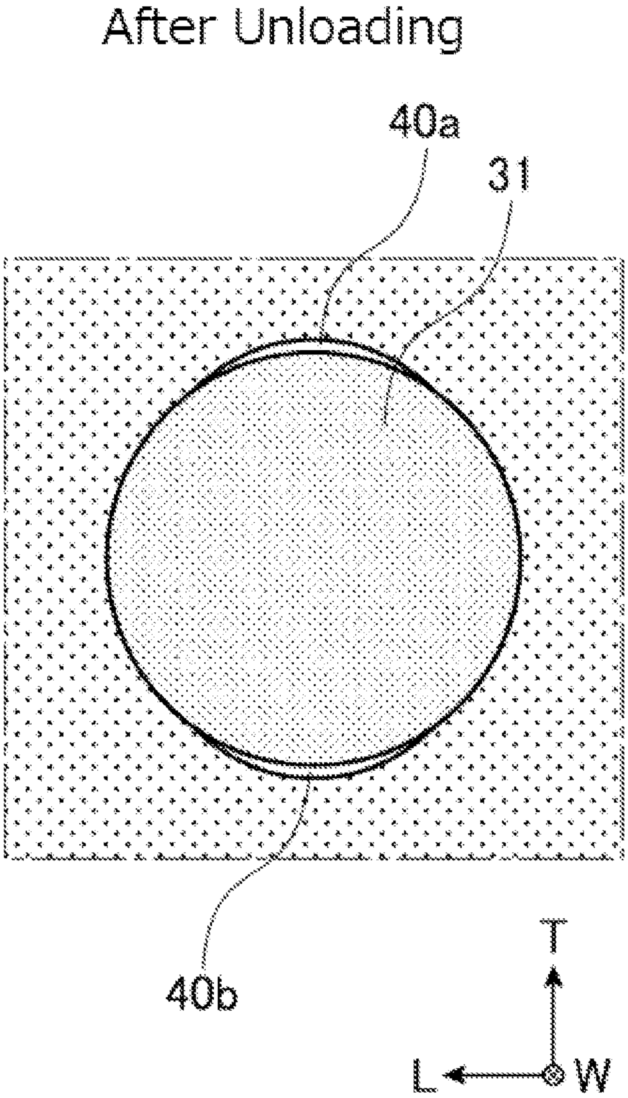

Since the molding pressure is larger than the elastic limit of the second metal magnetic particles 32, the second metal magnetic particles 32 are deformed plastically under the pressure of compression molding, and a stress acts from the second metal magnetic particles 32 deformed plastically onto the first metal magnetic particles 31 in a direction perpendicular to the pressurizing direction (hereinafter referred to as "the pressurized surface direction"). The pressurized surface direction in the embodiment shown is parallel with the WL surface. The first metal magnetic particles 31 are deformed elastically by the stress acting from the second metal magnetic particles 32 in the pressurized surface direction. The elastic deformation of the first metal magnetic particles 31 in the compression molding will now be described with reference to FIGS. 6A, 6B, and 6C. FIGS. 6A, 6B, and 6C schematically show the shapes of the cross section of the first metal magnetic particle 31 before pressurizing, during pressurizing, and after unloading, respectively. As shown in FIG. 6A, the cross section of the first metal magnetic particle 31 before pressurizing has a generally circular shape. Although the sectional shape of the first metal magnetic particle 31 is not limited to a circle, FIG. 6A shows that the first metal magnetic particle 31 has a circular shape for simplicity of explanation. When a molding pressure is applied to the resin composition mixture in the cavity of the mold, as shown in FIG. 6B, the stress acting in the pressurized surface direction from the second metal magnetic particles 32 deformed plastically causes the first metal magnetic particle 31 to be compressed elastically in the pressurized surface direction and have a shape elongated in the pressurizing direction (the T-axis direction) as compared to that before the pressurizing. Although a stress also acts in the pressurizing direction from the second metal magnetic particles 32 deformed plastically onto the first metal magnetic particle 31, the first metal magnetic particle 31 and the second metal magnetic particles 32 can move in the pressurizing direction within the cavity of the mold, and therefore, the stress acting in the pressurizing direction onto the first metal magnetic particle 31 urges the first metal magnetic particle 31 to move in the pressurizing direction but does not compress the first metal magnetic particle 31 elastically in the pressurizing direction. FIG. 6B does not show the second metal magnetic particles 32, but a large number of second metal magnetic particles 32 are present around the first metal magnetic particle 31, as shown in FIG. 4. After unloading, the molded body is taken out of the cavity of the mold. At this time, the molded body is freed from the compressive stress acting on the molded body in the pressurized surface direction, and thus the molded body expands in the pressurized surface direction. Therefore, the first metal magnetic particle 31 is also freed from the stress acting in the pressurizing direction from the second metal magnetic particles 32 onto the first metal magnetic particle 31, and thus the first metal magnetic particle 31 returns to its original shape, as shown in FIG. 6C. At this time, the second metal magnetic particles 32, which have been deformed plastically, do not return to the original shape thereof, although unloading causes some degree of springback. Therefore, after unloading, the molded body has gaps 51*a*, 51*b* formed on the opposite ends of the first metal magnetic particle 31 in the pressurizing direction. These gaps may receive the resin included in the resin composition mixture. The gaps 51*a*, 51*b* and/or the resin received in the gaps 51*a*, 51*b* will form the first magnetic gap components 40*a*, 40*b* when the magnetic base body 10 is finished.

After the molded body is obtained by compression molding, the manufacturing process proceeds to step S12. In step S12, heat treatment is performed on the molded body obtained by compression molding, thereby obtaining the magnetic base body 10 from the molded body. Specifically, the heat treatment in step S12 cures the resin in the resin composition mixture, so that the resin serves as the binder, and the binder binds together the first metal magnetic particles 31 and the second metal magnetic particles 32. The heat treatment is performed at a temperature equal to or higher than the curing temperature of the resin in the resin composition mixture. The heating in step S12 is performed at a temperature of 150° C. to 300° C. for a duration of 30 to 240 minutes, for example.

The heating in step S12 causes the elements constituting the first metal magnetic particles 31 to be oxidized, such that the insulating film 41 containing the oxides of the elements constituting the first metal magnetic particles 31 may be formed on the surface of the first metal magnetic particles 31.

Next, in step S13, a conductor paste is applied to the surface of the magnetic base body 10, which is obtained in step S12, to form the external electrode 21 and the external electrode 22. The external electrode 21 is electrically connected to one end of the coil conductor 25 placed within the magnetic base body 10, and the external electrode 22 is electrically connected to the other end of the coil conductor 25 placed within the magnetic base body 10. The external electrodes 21, 22 may include a plating layer. There may be two or more plating layers. The two plating layers may include an Ni plating layer and an Sn plating layer externally provided on the Ni plating layer. It is also possible that the external electrodes are formed as follows. The coil conductor 25 is placed such that the ends of the coil conductor 25 are exposed out of the magnetic base body 10, and the portions of the coil conductor 25 exposed out of the magnetic base body 10 are bent toward the mounting surface 10*b*, such that the portions of the coil conductor 25 exposed out of the magnetic base body 10 form the external electrodes.

The coil component 1 is manufactured in this manner. The manufactured coil component 1 may be mounted on the mounting substrate 2*a* using a reflow process. In this process, the mounting substrate 2*a* having the coil component 1 thereon passes at a high speed through a reflow furnace heated to, for example, a peak temperature of 260° C., and then the external electrodes 21, 22 are soldered to the corresponding land portions 3 of the mounting substrate 2*a*. In this way, the coil component 1 is mounted on the mounting substrate 2*a*, and thus the circuit board 2 is manufactured.

As described above, the insulating film 41 may be a coating film formed of an insulating material. When the insulating film 41 is a coating film, the preparation includes providing the first metal magnetic particles 31 with the insulating film formed on the surface thereof. The coating film may also be provided on the surface of the second metal magnetic particles 32.

Figure 7:
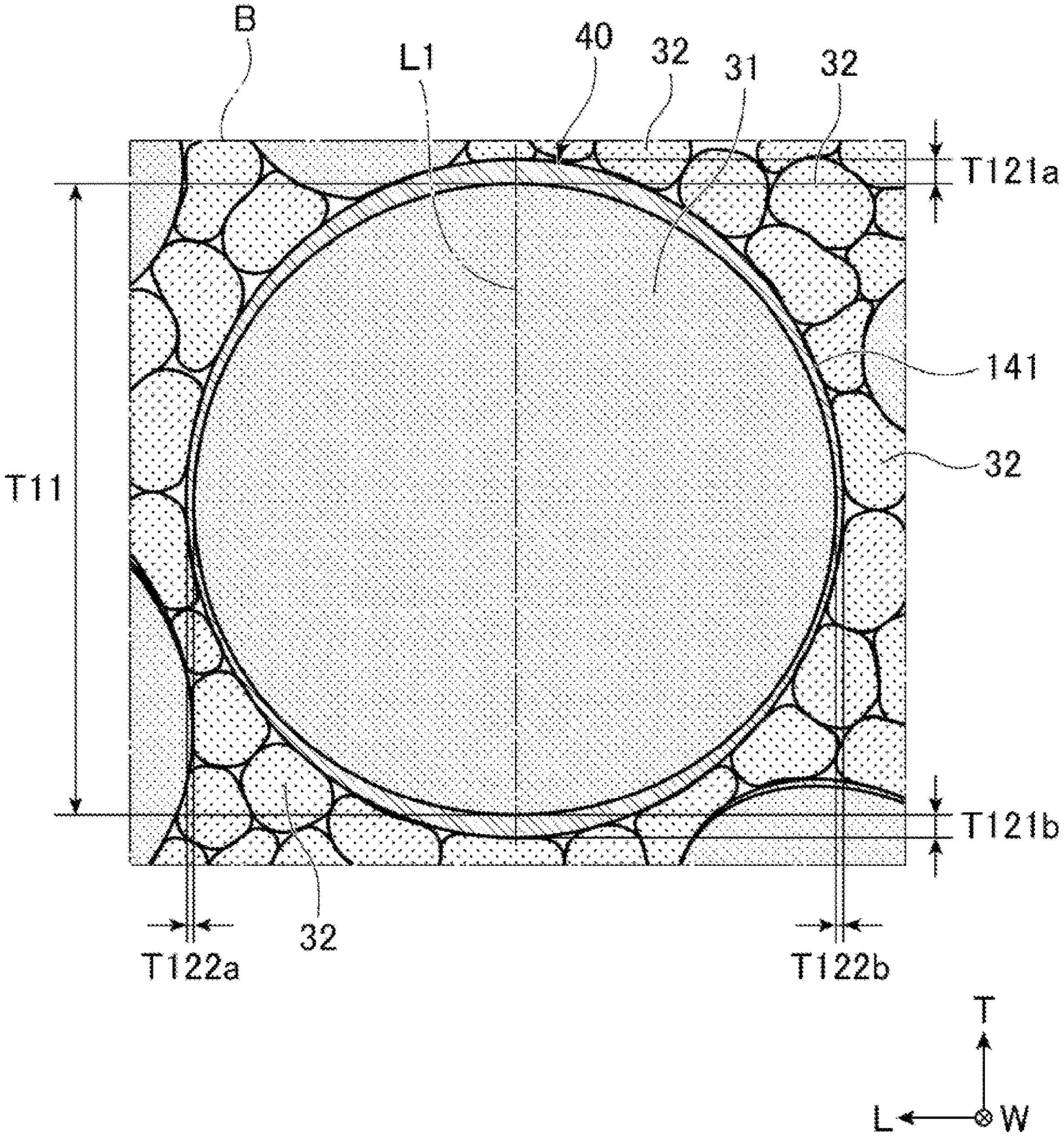
FIG. 7 is an enlarged schematic view of the region B of the magnetic base body of FIG. 3, showing the magnetic gap portion 40 in another embodiment of the invention.

The following describes the magnetic gap portion 40 in another embodiment of the invention with reference to FIG. 7. FIG. 7 is an enlarged schematic view of the region B of the magnetic base body of FIG. 3, showing the magnetic gap portion 40 in the other embodiment of the invention. In the embodiment shown in FIG. 7, the magnetic gap portion 40 includes an insulating film 141 instead of the insulating film 41. This is the difference from the embodiment shown in FIG. 3. The insulating film 141 is configured such that the thicknesses T121*a*, T121*b* thereof in the T-axis direction are larger than the thicknesses T122*a*, T122*b* thereof in the L-axis direction perpendicular to the T-axis direction. The thicknesses T121*a*, 121*b* of the insulating film 141 in the T-axis direction are, for example, 100 to 3,000 nm, and the thicknesses T122*a*, 122*b* of the insulating film 141 in the L-axis direction are, for example, less than 100 nm. Although the thicknesses of the insulating film 141 in the W-axis direction are not shown, they are the same or substantially the same as the thicknesses in the L-axis direction, specifically, smaller than the thicknesses T121*a*, 121*b* in the T-axis direction. The thicknesses T121*a*, T121*b* refer to the lengths for which a straight line extending along the line segment L1 intersects with the insulating film 141 on the positive side and the negative side in the T-axis direction. The line segment L1 is the longest line segment that is parallel with the T-axis and overlaps the sectional surface of the first metal magnetic particle 31. The thicknesses T122*a*, T122*b* of the insulating film 141 in the L-axis direction are defined and measured in the same manner as the thicknesses T121*a*, T121*b* thereof in the T-axis direction.

The insulating film 141 can be formed by adjusting the heating conditions in the heat treatment of step S12 described above and the composition of the first metal magnetic particle 31. Specifically, when the heat treatment of step S12 is performed under such heating conditions as to facilitate formation of an oxide film on the surface of the first metal magnetic particle 31, the gaps 51*a*, 51*b* formed in step S11 are filled with the oxide film of the elements constituting the first metal magnetic particle 31, and the oxide film forms the insulating film 141.

The magnetic gap portion 40 shown in FIG. 7 does not include the first magnetic gap components 40*a*, 40*b*. The magnetic gap portion 40 shown in FIG. 7 may include the first magnetic gap components 40*a*, 40*b*. For example, when a part of the gaps 51*a*, 51*b* formed in step S11 is filled with the oxide film of the elements constituting the first metal magnetic particle 31 with the remainder remaining as gaps, or when the gaps receive the resin, the regions of the gaps 51*a*, 51*b* not filled with the oxide film form the first magnetic gap components 40*a*, 40*b*.

Figure 8:
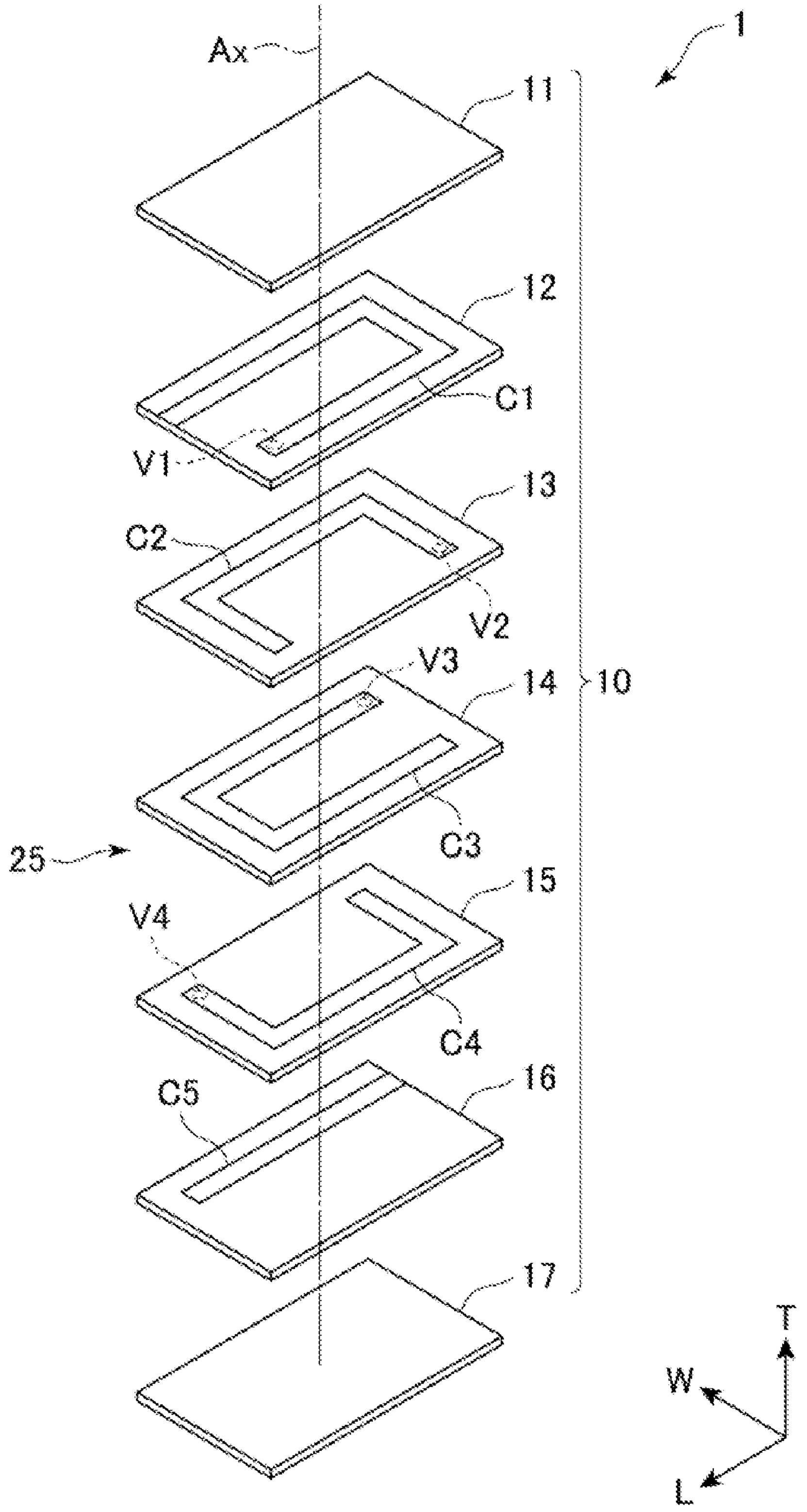
FIG. 8 is an exploded perspective view schematically showing a coil component according to another embodiment of the invention.

The following describes a coil component 1 according to another embodiment of the invention with reference to FIG. 8. The coil component 1 shown in FIG. 8 is a laminated coil.

The magnetic base body 10 may be fabricated by stacking a plurality of magnetic sheets 11 to 17 in the T-axis direction and bonding together the staked magnetic sheets by thermal compression. As previously described, the magnetic base body 10 includes a plurality of first metal magnetic particles 31 and a plurality of second metal magnetic particles 32, and further includes magnetic gap portions 40 formed of a low permeability material having a lower relative permeability than the material of the first metal magnetic particles 31. As described above, each of the magnetic gap portions 40 is configured such that the thicknesses thereof in the T-axis direction are larger than the thicknesses thereof in the directions perpendicular to the T-axis direction (the L-axis direction and the W-axis direction).

The coil conductor 25 extends around the coil axis Ax extending in the T-axis direction. As shown, the coil conductor 25 includes conductor patterns C1 to C5 and via conductors V1 to V4 connecting between adjacent ones of the conductor patterns C1 to C5. The via conductors V1 to V4 may be fabricated by filling a conductive paste into through-holes formed in the magnetic sheets 12 to 15 and extending in the T-axis direction. The conductor patterns C1 to C5 are formed by, for example, printing on the magnetic sheets a conductive paste made of a highly conductive metal or alloy via screen printing, for example. The conductive paste may be made of Ag, Pd, Cu, Al, or alloys thereof. Each of the conductor patterns C1 to C5 is electrically connected to the respective adjacent conductor patterns through the via conductors V1 to V4. The conductor patterns C1 to C5 and the via conductors V1 to V4 connected together in this manner form the coil conductor 25 extending spirally around the coil axis Ax.

Next, a description is given of an example method of manufacturing the coil component 1 shown in FIG. 8. The coil component 1 shown in FIG. 8 can be manufactured by a lamination process. The first step is to prepare a plurality of magnetic sheets 11 to 17 made of a magnetic material. Each of the magnetic sheets 11 to 17 can be obtained as follows. A resin composition mixture is formed by mixing and kneading a particle mixture, which contains the first metal magnetic particles 31 and the second metal magnetic particle 32, with a binder resin (for example, polyvinyl butyral (PVB) resin) and a diluting solvent (for example, toluene). The resin composition mixture thus formed is applied in the form of a sheet onto a base material such as a PET film by the doctor blade method for example. The applied resin composition mixture is dried to volatilize the diluting solvent.

Next, through-holes are formed at predetermined positions in the magnetic sheets 12 to 15 so as to extend through the magnetic sheets 12 to 15 in the T-axis direction. Following this, a conductive paste is printed by screen printing on the top surface of each of the magnetic sheets 12 to 16, so that an unfired conductor pattern is formed on each of the magnetic sheets 12 to 16. The conductive paste is also filled into the through-holes formed in the magnetic sheets 12 to 15. The unfired conductor patterns formed on the magnetic sheets 12 to 16 are precursors of the conductor patterns C1 to C5, and the conductor paste filled into the through-holes in the magnetic sheets 12 to 15 are precursors of the via conductors V1 to V4.

Next, after the conductive paste has been dried, the magnetic sheets 11 to 17 are staked together. The magnetic sheets 11 to 17 are stacked together such that adjacent ones of the precursors of the conductor patterns C1 to C5 formed on these magnetic sheets are electrically connected to each other through the precursors of the via conductors V1 to V4. Next, the magnetic sheets stacked together as described above are bonded together by thermal compression using a pressing machine to fabricate a sheet laminate. In the thermocompression bonding, the sheet laminate is pressurized along the lamination direction of the magnetic sheets 11 to 17 with a pressure smaller than the elastic limit of the first metal magnetic particles 31 and larger than the elastic limit of the second metal magnetic particles 32. Specifically, the sheet laminate is placed in a cavity of a mold, and a molding pressure is applied to the sheet laminate in the cavity of the mold using a punch. Through this compression molding process, a molded body containing the precursors of the conductor patterns C1 to C5 is fabricated. The sheet laminate is placed in the cavity of the mold such that the coil axis Ax corresponds or substantially corresponds to the direction of a stroke of the punch (the pressurizing direction). When the angle between the coil axis Ax and the direction of a stroke of the punch is 30 degrees or smaller, it can be determined that the coil axis Ax corresponds or substantially corresponds to the pressurizing direction.

In the compression molding performed on the sheet laminate, the sheet laminate is compression-molded with a molding pressure smaller than the elastic limit of the first metal magnetic particles 31 and larger than the elastic limit of the second metal magnetic particles 32, to fabricate a molded body. The molding pressure causes elastic deformation of the first metal magnetic particles 31 and plastic deformation of the second metal magnetic particles 32. A specific example of the molding pressure, which varies depending on the materials of the first metal magnetic particles 31 and the second metal magnetic particles 32, may be 5 to 15 ton/cm$^2$. For example, when the first metal magnetic particles 31 are formed of Fe—Si—Cr—B amorphous alloy and the second metal magnetic particles 32 are formed of carbonyl iron, the compression molding may be performed with a molding pressure of 5 to 12 ton/cm$^2$.

Since the molding pressure applied in compressing molding of the sheet laminate is larger than the elastic limit of the second metal magnetic particles 32, the second metal magnetic particles 32 are deformed plastically under the pressure of compression molding, and a stress acts from the second metal magnetic particles 32 deformed plastically onto the first metal magnetic particles 31 in a direction perpendicular to the pressurizing direction (hereinafter referred to as "the pressurized surface direction"). The pressurized surface direction in the embodiment shown is parallel with the WL surface. The first metal magnetic particles 31 are deformed elastically by the stress acting from the second metal magnetic particles 32 in the pressurized surface direction. The description will be omitted for the elastic deformation of the first metal magnetic particles 31 and resultant formation of the first magnetic gap components 40*a*, 40*b* in the compression molding, because these are the same as in the first embodiment.

Next, the sheet laminate bonded by thermal compression is diced to a desired size by using a cutter such as a dicing machine or a laser processing machine to make a chip laminate. Next, the chip laminate is degreased and then heated. This heating oxidizes the surface of the first and second metal magnetic particles 31 and 32, as a result of which the first and second metal magnetic particles 31 and 32 are covered with an oxide coating. The oxide coating bonds together adjacent ones of the metal magnetic particles. The heating is performed at a temperature of 350° C. to 900° C. for a duration of 30 to 360 minutes, for example. The degreasing may be performed separately from the heat treatment for oxidizing the first metal magnetic particles 31 and the second metal magnetic particles 32. In the degreasing performed separately from the heat treatment for the first metal magnetic particles 31 and the second metal magnetic particles 32, the chip laminate is heated at a temperature of 200° C. to 400° C. for a duration of 20 to 120 minutes, for example. The prominent first magnetic gap components 40*a*, 40*b* produced in molding remain as gaps after the heat treatment and form the first magnetic gap components 40*a*, 40*b*. The gap portions of the first magnetic gap components 40*a*, 40*b* may receive a resin or the like as necessary.

Next, the end portions of the chip laminate are polished by barrel-polishing or the like as necessary. Next, a conductive paste is applied to both end portions of the chip laminate to form the external electrodes. The coil component 1 is obtained by the lamination process in the above-described manner.

Figure 9:
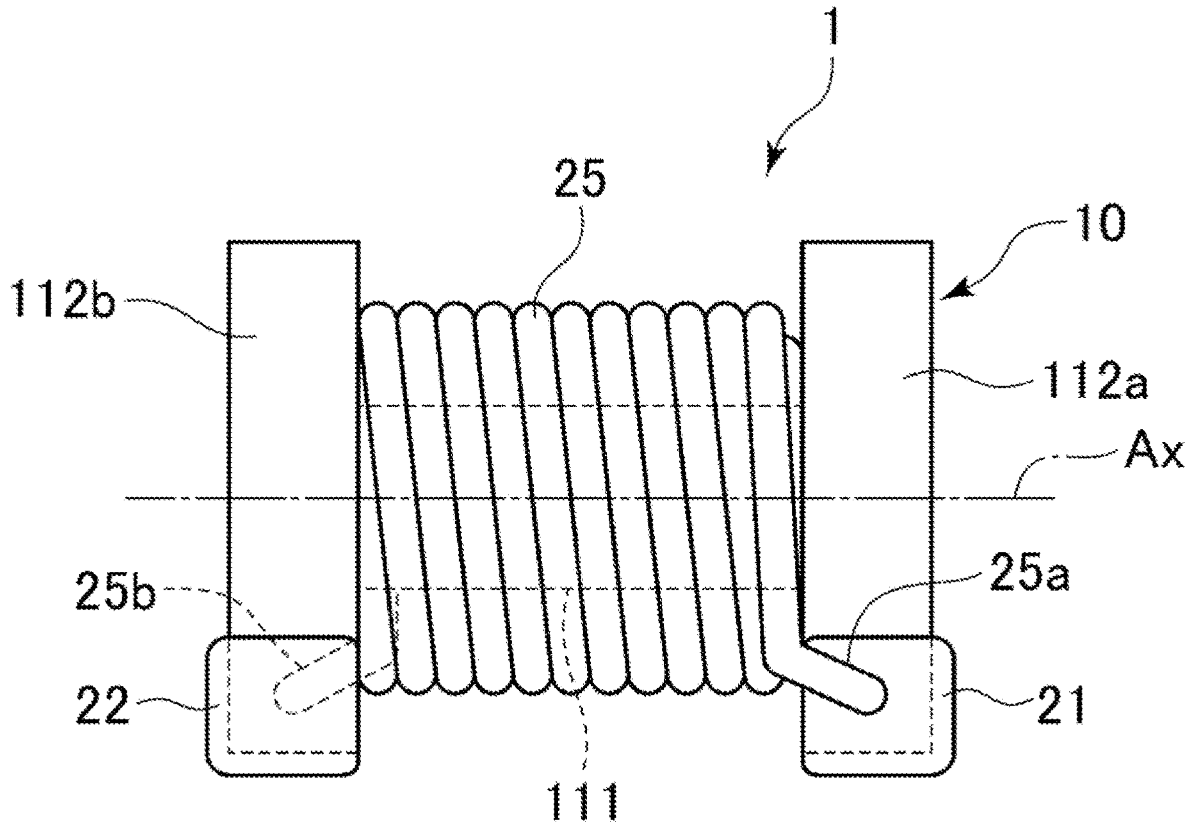
FIG. 9 is a front view schematically showing a coil component according to still another embodiment of the present invention.

The following describes a coil component 1 according to another embodiment of the invention with reference to FIG. 9. The coil component 1 relating to one embodiment of the present invention is a winding inductor. As shown, the coil component 1 in the embodiment shown in FIG. 9 includes a magnetic base body 10 shaped like a drum, a coil conductor 25, a first external electrode 21 and a second external electrode 22. The magnetic base body 10 includes a winding core 111, a flange 112*a* having a rectangular parallelepiped shape and provided on one of the ends of the winding core 111, and a flange 112*b* having a rectangular parallelepiped shape and provided on the other end of the winding core 111. The winding core 111 extends along the coil axis Ax. The coil conductor 25 is wound on the winding core 111. In other words, the coil conductor 25 extends spirally around the coil axis Ax. The coil conductor 25 includes a conductive wire made of a highly conductive metal material and an insulating coating covering and surrounding the conductive wire. The first external electrode 21 extends along the bottom surface of the flange 112*a*, and the second external electrode 22 extends along the bottom surface of the flange 112*b*.

As described above, the magnetic base body 10 includes a plurality of first metal magnetic particles 31 and a plurality of second metal magnetic particles 32, and further includes magnetic gap portions 40 formed of a low permeability material having a lower relative permeability than the material of the first metal magnetic particles 31. As described above, each of the magnetic gap portions 40 is configured such that the thicknesses thereof in the T-axis direction are larger than the thicknesses thereof in the directions perpendicular to the T-axis direction (the L-axis direction and the W-axis direction).

Next, a description is given of an example method of manufacturing the winding coil component 1 shown in FIG. 9. The first step is to fabricate the magnetic base body 10 by compression molding of a resin composition mixture. In this compression molding step, a particle mixture of the first metal magnetic particles 31 and the second metal magnetic particles 32 is first mixed and kneaded with a resin and a diluting solvent, thereby making a resin composition mixture. The resin composition mixture contains the metal magnetic particles dispersed therein. The resin composition mixture is placed into a mold, and molding pressure of 5 to 15 ton/cm$^2$ is applied while the resin composition mixture in the mold is heated. In this way, a molded body is fabricated. The pressurizing direction of the molding pressure is parallel with the axis of the winding core 111. The axis of the winding core 111 forms the coil axis Ax when the coil component 1 is finished.

The molded body obtained by the above-described compression molding step is subjected to a heat treatment step in which heat treatment is performed. The heat treatment step produces the magnetic base body 10 from the molded body. Specifically, the heat treatment step cures the resin in the resin composition mixture, so that the resin serves as the binder, and the binder binds together the first metal magnetic particles 31 and the second metal magnetic particles 32. The heat treatment is performed at a temperature equal to or higher than the curing temperature of the resin in the resin composition mixture. For example, the heat treatment is performed at a temperature from 150° C. to 300° C. for a duration of 30 to 240 minutes.

This is followed by a wire winding step, in which a coil conductor 25 is provided on the magnetic base body 10 resulting from the above-described heat treatment. In the wire winding step, the coil conductor 25 is wound around the winding core 111 of the magnetic base body 10. Next, one end of the coil conductor 25 is connected to the first external electrode 21, and the other end is connected to the second external electrode 22. The winding coil component 1 is obtained in the above-described manner.

As described above, the magnetic base body 10 includes a plurality of first metal magnetic particles 31 and a plurality of second metal magnetic particles 32, and further includes the prominent first magnetic gap component 40*a* and/or first magnetic gap component 40*b* on at least one of the ends of the first metal magnetic particles 31 in the direction parallel with the coil axis Ax.

EXAMPLES

Example 1

First, Fe—Si—B amorphous particles having an average particle diameter of 20 μm were prepared as the first metal magnetic particles 31, and carbonyl iron particles having an average particle diameter of 5 μm were prepared as the second metal magnetic particles 32. These two types of metal magnetic powders were mixed at a volume ratio of 30:70 to obtain a particle mixture. The elastic limit of carbonyl iron is smaller than the elastic limit of Fe—Si—B amorphous alloy. The relative permeability of carbonyl iron is smaller than the relative permeability of Fe—Si—B amorphous alloy. Next, for 100 wt % of the particle mixture, 3 wt % of epoxy resin was mixed and kneaded with the particle mixture to produce a resin composition mixture. An enamel-coated copper wire having a diameter of 2 mm was wound around the coil axis Ax for 4.5 turns to produce the coil conductor 25. The enamel coating was removed from portions of the coil conductor 25 at a distance of 1.5 mm from the both ends of the coil conductor 25, and a solder layer was formed on each of these portions from which the enamel coating had been removed. The coil conductor 25 was placed in a cavity of a mold such that the coil axis Ax substantially corresponds to the pressurizing direction. Next, the resin composition mixture described above was filled into the cavity of the mold, and a molding pressure of 12 ton/cm$^2$ was applied, thereby forming a molded body containing the coil conductor 25. The molding pressure was applied in the direction parallel with the coil axis Ax of the coil conductor 25. The pressure of 12 ton/cm$^2$ is larger than the elastic limit of carbonyl iron and is smaller than the elastic limit of Fe—Si—B amorphous alloy.

Subsequently, the molding pressure was unloaded and the molded body was taken out of the cavity of the mold. The molded body taken out of the cavity of the mold was subjected to heat treatment at a temperature of 200° C. for a duration of 60 minutes to cure the epoxy resin in the resin composition mixture, thereby forming a magnetic base body 10 from the molded body. After the heat treatment, the end portions of the coil conductor 25 were bent to be opposed to the mounting surface 10*b* of the magnetic base body 10. The coil component fabricated in this manner is taken as Sample 1.

The coil component fabricated in the above manner (Sample 1) was cut along the coil axis Ax to expose a sectional surface, and the sectional surface was photographed at a magnification of 1000 to obtain a SEM image. The SEM image was analyzed with EDS to determine the composition of each particle, and 20 particles were selected in the ascending order of the molar proportion of iron as particles to be observed. Among these observed particles, 16 particles were observed to have at least one gap covering at least one of the ends of the associated particle in the direction along the coil axis Ax. The gaps covering at least one of the ends of the observed particles in the direction along the coil axis Ax had an average dimension of 630 nm in the direction along the coil axis Ax. The gaps covering at least one of the ends of the observed particles in the direction along the coil axis Ax were measured for the dimension thereof in the direction along the coil axis Ax by the same method as the dimensions T21*a*, T21*b* were measured previously. No insulating film was observed on the surfaces of the observed particles. Therefore, the gaps covering the ends of the observed particles in the direction along the coil axis Ax correspond to the magnetic gap portions 40.

Example 2

Next, Fe—Si alloy particles (93.5 wt % Fe and 6.5 wt % Si) having an average particle diameter of 10 μm were prepared as the first metal magnetic particles 31, and Fe—Si alloy particles (97 wt % Fe and 3 wt % Si) having an average particle diameter of 10 μm were prepared as the second metal magnetic particles 32. These two types of metal magnetic powders were mixed at a volume ratio of 30:70 to obtain a particle mixture. The proportion of Si in the second metal magnetic particles 32 is smaller than that in the first metal magnetic particles 31, such that the elastic limit of the second metal magnetic particles 32 is smaller than that of the first metal magnetic particles 31, and the relative permeability of the second metal magnetic particles 32 is smaller than that of the first metal magnetic particles 31. This particle mixture was used to fabricate a coil component by the same method as in Example 1. The coil component fabricated in this manner is taken as Sample 2. However, the molding pressure for fabricating the molded body was 6 ton/cm$^2$, which is larger than the elastic limit of Fe—Si alloy particles containing 97 wt % Fe and 3 wt % Si and is smaller than the elastic limit of Fe—Si alloy particles containing 93.5 wt % Fe and 6.5 wt % Si.

The coil component fabricated in the above manner (Sample 2) was cut along the coil axis Ax to expose a sectional surface, and the sectional surface was photographed at a magnification of 1000 to obtain a SEM image. The SEM image was analyzed with EDS to determine the composition of each particle, and 20 particles were selected in the ascending order of the molar proportion of iron as particles to be observed. Among these observed particles, 14 particles were observed to have at least one gap covering at least one of the ends of the associated particle in the direction along the coil axis Ax. The gaps covering at least one of the ends of the observed particles in the direction along the coil axis Ax had an average dimension of 120 nm in the direction along the coil axis Ax. The gaps covering at least one of the ends of the observed particles in the direction along the coil axis Ax were measured for the dimension thereof in the direction along the coil axis Ax by the same method as the dimensions T21*a*, T21*b* were measured previously. No insulating film was observed on the surfaces of the observed particles. Therefore, the gaps covering the ends of the observed particles in the direction along the coil axis Ax correspond to the magnetic gap portions 40.

Example 3

Next, Fe—Si—Cr alloy particles (92 wt % Fe, 6.5 wt % Si, and 1.5 wt % Cr) having an average particle diameter of 4 μm were prepared as the first metal magnetic particles 31, and Fe—Si—Cr alloy particles (95 wt % Fe, 3 wt % Si, and 2 wt % Cr) having an average particle diameter of 3 μm were prepared as the second metal magnetic particles 32. These two types of metal magnetic powders were mixed at a volume ratio of 30:70 to obtain a particle mixture. The proportion of Si in the second metal magnetic particles 32 is smaller than that in the first metal magnetic particles 31, such that the elastic limit of the second metal magnetic particles 32 is smaller than that of the first metal magnetic particles 31, and the relative permeability of the second metal magnetic particles 32 is smaller than that of the first metal magnetic particles 31. This particle mixture was used to fabricate a coil component by the lamination process. Specifically, the particle mixture was mixed and kneaded with polyvinyl butyral resin and toluene to make the resin composition mixture, and the resin composition mixture was applied onto a PET film in a sheet form by the doctor blade method. The resin composition mixture applied onto the film was dried to volatilize the diluting solvent, thereby forming a plurality of magnetic sheets. Next, four of these magnetic sheets were drilled to form through-holes for receiving the via conductors V1 to V4. Next, a conductive paste was printed on the top surfaces of four magnetic sheets having the through-holes formed therein and one magnetic sheet having no through-hole formed therein, and the conductive paste was also filled into the through-holes, thereby forming the precursors of the conductor patterns C1 to C5 and the via conductors V1 to V4 shown in FIG. 8. After the conductive paste was dried, the five magnetic sheets having the precursors of the conductor patterns formed thereon and two magnetic sheets having no conductor pattern formed thereon were stacked together such that the two magnetic sheets having no conductor pattern formed thereon were positioned at the top end and the bottom end. These magnetic sheets stacked together was subjected to a pressure of 6 ton/cm$^2$ applied in the lamination direction to bond together the magnetic sheets by thermal compression, thus forming a sheet laminate. The pressure of 6 ton/cm$^2$ is larger than the elastic limit of Fe—Si—Cr alloy particles containing 95 wt % Fe, 3 wt % Si, and 2 wt % Cr (the second metal magnetic particles 32) and is smaller than the elastic limit of Fe—Si—Cr alloy particles containing 92 wt % Fe, 6.5 wt % Si, and 1.5 wt % Cr (the first metal magnetic particles 31).

Next, the sheet laminate bonded by thermal compression was diced into a chip laminate. Next, the chip laminate was subjected to heat treatment in an atmosphere containing oxygen at 750° C. for 60 minutes to thermally decompose polyvinyl butyral resin and form an oxide film on the surfaces of the metal magnetic particles, thereby forming the magnetic base body 10 and the coil conductor 25. Next, a conductive paste made by mixing and kneading silver particles with ethyl cellulose and butyl carbitol was applied onto the surface of the magnetic base body 10, and the applied conductive paste was baked to form a foundation electrode layer. Next, a nickel-tin plating layer was formed on the surface of the foundation electrode layer. In this way, an external electrode including the foundation electrode layer and the plating layer was formed on the surface of the magnetic base body 10. The coil component fabricated in this manner is taken as Sample 3.

The coil component fabricated in the above manner (Sample 3) was cut along the coil axis Ax to expose a sectional surface, and the sectional surface was photographed at a magnification of 1000 to obtain a SEM image. The SEM image was analyzed with EDS to determine the composition of each particle, and 20 particles were selected in the ascending order of the molar proportion of iron as particles to be observed. Among these observed particles, 15 particles were observed to have at least one gap covering at least one of the ends of the associated particle in the direction along the coil axis Ax. The gaps covering at least one of the ends of the observed particles in the direction along the coil axis Ax had an average dimension of 65 nm in the direction along the coil axis Ax. The gaps covering at least one of the ends of the observed particles in the direction along the coil axis Ax were measured for the dimension thereof in the direction along the coil axis Ax by the same method as the dimensions T21$a$, T21$b$ were measured previously. No insulating film was observed on the surfaces of the observed particles. Therefore, the gaps covering the ends of the observed particles in the direction along the coil axis Ax correspond to the magnetic gap portions 40.

Comparative Example 1

A coil component was fabricated by the same manufacturing method as Sample 2, except that the molding pressure was changed to 10 ton/cm$^2$. The pressure of 10 ton/cm$^2$ is larger than the elastic limit of Fe—Si alloy particles containing 93.5 wt % Fe and 6.5 wt % Si (the first metal magnetic particles 31). The coil component fabricated in the above manner (Sample 4) was cut along the coil axis Ax to expose a sectional surface, and the sectional surface was photographed at a magnification of 1000 to obtain a SEM image. The SEM image was analyzed with EDS to determine the composition of each particle, and 20 particles were selected in the ascending order of the molar proportion of iron as particles to be observed. None of these observed particles was observed to include gaps covering the ends of the associated particle in the T-axis direction or other regions corresponding to the first magnetic gap components 40$a$, 40$b$. The reason that no magnetic gap portion was formed on the ends of the first metal magnetic particles 31 in the T-axis direction is that the manufacturing method of Sample 4 included application of the molding pressure larger than the elastic limit of the first metal magnetic particles 31, causing the first metal magnetic particles 31 to be deformed plastically and thus unable to return to the original shapes thereof after unloading.

Comparative Example 2

A coil component was fabricated by the same manufacturing method as Sample 2, except that the molding pressure was changed to 1 ton/cm$^2$. The pressure of 1 ton/cm$^2$ is smaller than the elastic limit of Fe—Si alloy particles containing 97 wt % Fe and 3 wt % Si (the second metal magnetic particles 32). The coil component fabricated in the above manner (Sample 5) was cut along the coil axis Ax to expose a sectional surface, and the sectional surface was photographed at a magnification of 1000 to obtain a SEM image. The SEM image was analyzed with EDS to determine the composition of each particle, and 20 particles were selected in the ascending order of the molar proportion of iron as particles to be observed. Each of these observed particles was observed to be at a large distance from adjacent particles and was encircled by the resin. In Sample 5, none of the observed particles was observed to include gaps covering the ends of the associated particle in the T-axis direction or other regions corresponding to the first magnetic gap components 40$a$, 40$b$. The reason that the first magnetic gap components 40$a$, 40$b$ covering a part of the surfaces of Fe—Si alloy particles containing 93.5 wt % Fe and 6.5 wt % Si (the first metal magnetic particles 31) and not covering the entirety of the surface thereof were not formed on the ends of the first metal magnetic particles 31 in the T-axis direction is that the manufacturing method of Sample 5 included application of the molding pressure smaller than the elastic limit of the second metal magnetic particles 32, failing to fill the first metal magnetic particles 31 and the second metal magnetic particles 32 at a high density.

Comparative Example 3

A coil component was fabricated by the same manufacturing method as Sample 1, except that the molding pressure was applied in a direction perpendicular to the coil axis Ax. The coil component fabricated in this manner (Sample 6) was cut along the coil axis Ax to expose a sectional surface, and the sectional surface was photographed at a magnification of 1000 to obtain a SEM image. The SEM image was analyzed with EDS to determine the composition of each particle, and 20 particles were selected in the ascending order of the molar proportion of iron as particles to be observed. Among these observed particles, 10 particles were observed to have at least one gap covering at least one of the sides of the associated particle in the direction perpendicular to the coil axis Ax. However, the observed gaps did not correspond to the first magnetic gap components 40$a$, 40$b$ because the observed gaps did not cover the ends of the first metal magnetic particles 31 in the direction along the coil axis Ax. Therefore, as will be described later, Sample 6 had low DC superposition characteristics.

An impedance analyzer was used to measure the inductance and the DC superposition rated current of each of Samples 1 to 6. The measurement results are listed in Table 1.

TABLE 1

| | Inductance [μH] | DC Superposition Rated Current [A] |
|---|---|---|
| Sample 1 (Example 1) | 1.0 | 8.5 |
| Sample 2 (Example 2) | 1.0 | 8.2 |
| Sample 3 (Example 3) | 1.0 | 8.0 |
| Sample 4 (Comparative Example 1) | 1.2 | 5.5 |
| Sample 5 (Comparative Example 2) | 0.5 | 9.0 |
| Sample 6 (Comparative Example 3) | 1.1 | 7.5 |

As shown in Table 1, Samples 1 to 3, which include the magnetic gap portion on the ends of the first metal magnetic particles 31 in the direction along the coil axis, had an inductance of 1.0 μH and a DC superposition rated current of 8.0 to 8.5 A. The measurement result of Sample 2 is now compared with that of Sample 4. The manufacturing methods of Sample 2 and Sample 4 were the same except for the molding pressure. Sample 2, which was subjected to a molding pressure smaller than the elastic limit of the first metal magnetic particles 31 and larger than the elastic limit of the second metal magnetic particles 32, had a DC superposition rated current of 8.2 A. This is a significant improvement from that of Sample 4, which was subjected to a molding pressure larger than the elastic limit of the first metal magnetic particles 31, measured to be 5.5 A. This improvement of the DC superposition characteristics can be attributed to the gaps (the first magnetic gap components 40*a*, 40*b*) formed in the magnetic base body 10 of Sample 2 to cover the ends of the first metal magnetic particles 31 in the T-axis direction. On the other hand, Sample 2 had an inductance of 1.0 μH, which was only slightly reduced from that of Sample 4 measured to be 1.2 μH. Next, the measurement result of Sample 2 is compared with that of Sample 5. The manufacturing methods of Sample 2 and Sample 5 were the same except for the molding pressure. Sample 5, which was fabricated by applying a molding pressure smaller than the elastic limit of the second metal magnetic particles 32, had an inductance of 0.5 μH. This is significantly inferior to that of Sample 2 measured to be 1.0 μH. These results revealed that both a high permeability (inductance) and high DC superposition characteristics (DC superposition rated current) can be obtained with the magnetic gap portions provided on the ends of the first metal magnetic particles 31 in the direction along the coil axis, by applying a molding pressure smaller than the elastic limit of the first metal magnetic particles 31 and larger than the elastic limit of the second metal magnetic particles 32.

Comparison between the DC superposition rated currents of Sample 1 and Sample 6, which are different only in the pressurizing direction relative to the coil axis, indicates that Sample 1 has a better DC superposition rated current. This comparison revealed that the DC superposition characteristics can be improved to a higher degree with the gaps corresponding the first magnetic gap components 40*a*, 40*b* provided on the ends of the first metal magnetic particles 31 in the direction along the coil axis.

As described above, according to at least one of the embodiments of the invention, the magnetic gap portions 40 are provided to cover the surfaces of the first metal magnetic particles 31 prone to magnetic saturation, and the thicknesses of the magnetic gap portions 40 in the direction along the coil axis Ax are larger than the thicknesses thereof in the direction perpendicular to the coil axis Ax. The magnetic gap portion 40 inhibits the magnetic flux flowing through the magnetic base body 10 along the coil axis Ax from being concentrated in the magnetic path passing through the first metal magnetic particles 31, and thus high DC current superposition characteristics can be obtained. In addition, since the thicknesses of the magnetic gap portions 40 in the direction perpendicular to the coil axis Ax are smaller than the thicknesses thereof in the direction along the coil axis Ax, it is possible to inhibit the reduction of permeability and thus achieve both a high permeability and high DC superposition characteristics.

The dimensions, materials, and arrangements of the constituent elements described for the above various embodiments are not limited to those explicitly described for the embodiments, and these constituent elements can be modified to have any dimensions, materials, and arrangements within the scope of the present invention. For example, the magnetic base body 10 may be configured and arranged to either contain the coil conductor 25, as shown in FIGS. 1 and 2, or have the coil conductor 25 wound thereon, as shown in FIG. 9.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. A coil component comprising:

a coil conductor extending around a coil axis; and a magnetic base body disposed to intersect the coil axis, the magnetic base body including first metal magnetic particles, second metal magnetic particles, and magnetic gap portions, each of the first metal magnetic particles having a first elastic limit and a first relative permeability, each of the second metal magnetic particles having a second elastic limit smaller than the first elastic limit and a second relative permeability lower than the first relative permeability, each of the magnetic gap portions covering a surface of associated one of the first metal magnetic particles and configured such that a first thickness of the magnetic gap portion in a first direction along the coil axis is larger than a second thickness of the magnetic gap portion in a second direction perpendicular to the first direction.

2. The coil component of claim 1, wherein each of the magnetic gap portions includes a first magnetic gap component formed of at least one of a gap or a resin and covering one end of the associated one of the first metal magnetic particles in the first direction.

3. The coil component of claim 2, wherein when observed in a sectional surface of the magnetic base body cut along a plane extending through the coil axis, the first magnetic gap component extends in a circumferential direction of the associated one of the first metal magnetic particles for a length of 1/16 or larger and less than 1/2 of a circumference of the associated one of the first metal magnetic particles.

4. The coil component of claim 1, wherein each of the magnetic gap portions includes a second magnetic gap component containing an oxide of an element contained in the associated one of the first metal magnetic particles.

5. The coil component of claim 4, wherein a thickness of the second magnetic gap component in the first direction is larger than a thickness of the second magnetic gap component in the second direction.

6. The coil component of claim 1, wherein when observed in a sectional surface of the magnetic base body cut along a plane extending through the coil axis, a dimension of each of the magnetic gap portions in the first direction is from 0.5% to 4.0%, both inclusive, of a dimension of the associated one of the first metal magnetic particles in the first direction.

7. The coil component of claim 1, wherein both the first metal magnetic particles and the second metal magnetic particles are formed of an Fe—Si-based alloy, and wherein a proportion of Si in the first metal magnetic particles is larger than that in the second metal magnetic particles.

8. The coil component of claim 7, wherein a proportion of Fe in the first metal magnetic particles is smaller than that in the second metal magnetic particles.

9. The coil component of claim 1, wherein in the magnetic base body, a volume proportion of a volume of the first metal magnetic particles to a total volume of the first metal magnetic particles and the second metal magnetic particles is 10 to 65 vol %.

10. The coil component of claim 1, wherein the magnetic base body is molded by pressurizing an element body in the first direction, the element body containing the first metal magnetic particles and the second metal magnetic particles.

11. The coil component of claim 2, wherein each of the magnetic gap portions includes another first magnetic gap component formed of at least one of a gap or a resin and covering the other end of the associated one of the first metal magnetic particles in the first direction.

12. A circuit board comprising the coil component of claim 1.

13. An electronic device comprising the circuit board of claim 12.

* * * * *